United States Patent [19]
Kodama

[11] Patent Number: 5,627,621
[45] Date of Patent: May 6, 1997

[54] CAMERA

[75] Inventor: Shinichi Kodama, Tokyo, Japan

[73] Assignee: Olympus Optical Co., Ltd., Tokyo, Japan

[21] Appl. No.: 489,219

[22] Filed: Jun. 12, 1995

[30]  Foreign Application Priority Data

Jun. 22, 1994 [JP] Japan .................... 6-140483

[51] Int. Cl.$^6$ .................................... G03B 13/02
[52] U.S. Cl. .................... 396/373; 351/208; 351/210; 396/233; 396/51
[58] Field of Search .................. 354/219, 222, 354/221, 62, 410, 432; 351/208, 210

[56]  References Cited

U.S. PATENT DOCUMENTS 5,335,035  8/1994  Maeda ..................... 354/219

FOREIGN PATENT DOCUMENTS

| | | |
|---|---|---|
| 63-194237 | 8/1988 | Japan . |
| 63-206731 | 8/1988 | Japan . |
| 2-206425 | 8/1990 | Japan . |
| 4-307506 | 10/1992 | Japan . |
| 5-88075 | 4/1993 | Japan . |

OTHER PUBLICATIONS

Magazine "O plus E"; No. 115; published Jun. 1989; pp. 122–125.

*Primary Examiner*—Safet Metjahic
*Assistant Examiner*—D. P. Malley
*Attorney, Agent, or Firm*—Frishauf, Holtz, Goodman, Langer & Chick

[57]  ABSTRACT

In a camera with a finder device which is capable of diopter adjustment, a visual axis detection unit detects the visual axis direction and the fundus imaging state of an observer, a multi-distance measurement unit measures distances to a plurality of points in a photographing frame, a diopter driving unit adjusts the imaging position, and a diopter controller drives the diopter driving unit in accordance with the outputs from the visual axis detection unit and the multi-distance measurement unit. Therefore, since diopter correction is attained based on distance measurement information corresponding to visual axis information, a finder image in which an object at an observation position of an observer is always in focus can be realized.

28 Claims, 21 Drawing Sheets

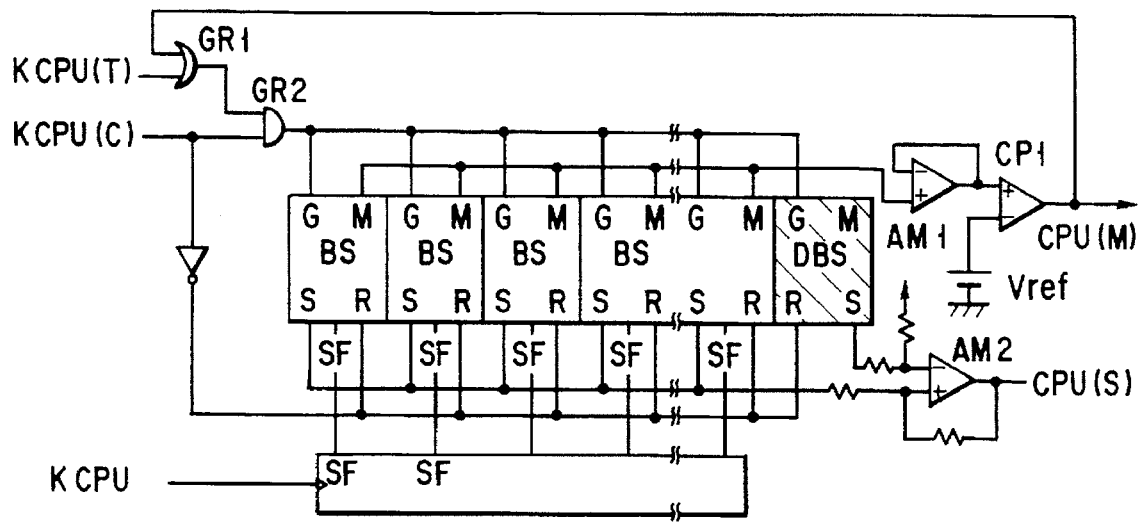
F I G. 16A
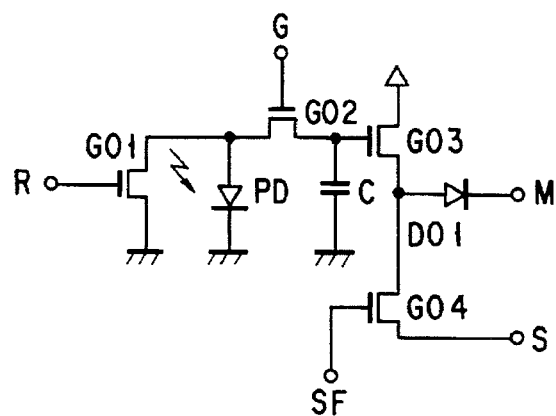
F I G. 16B

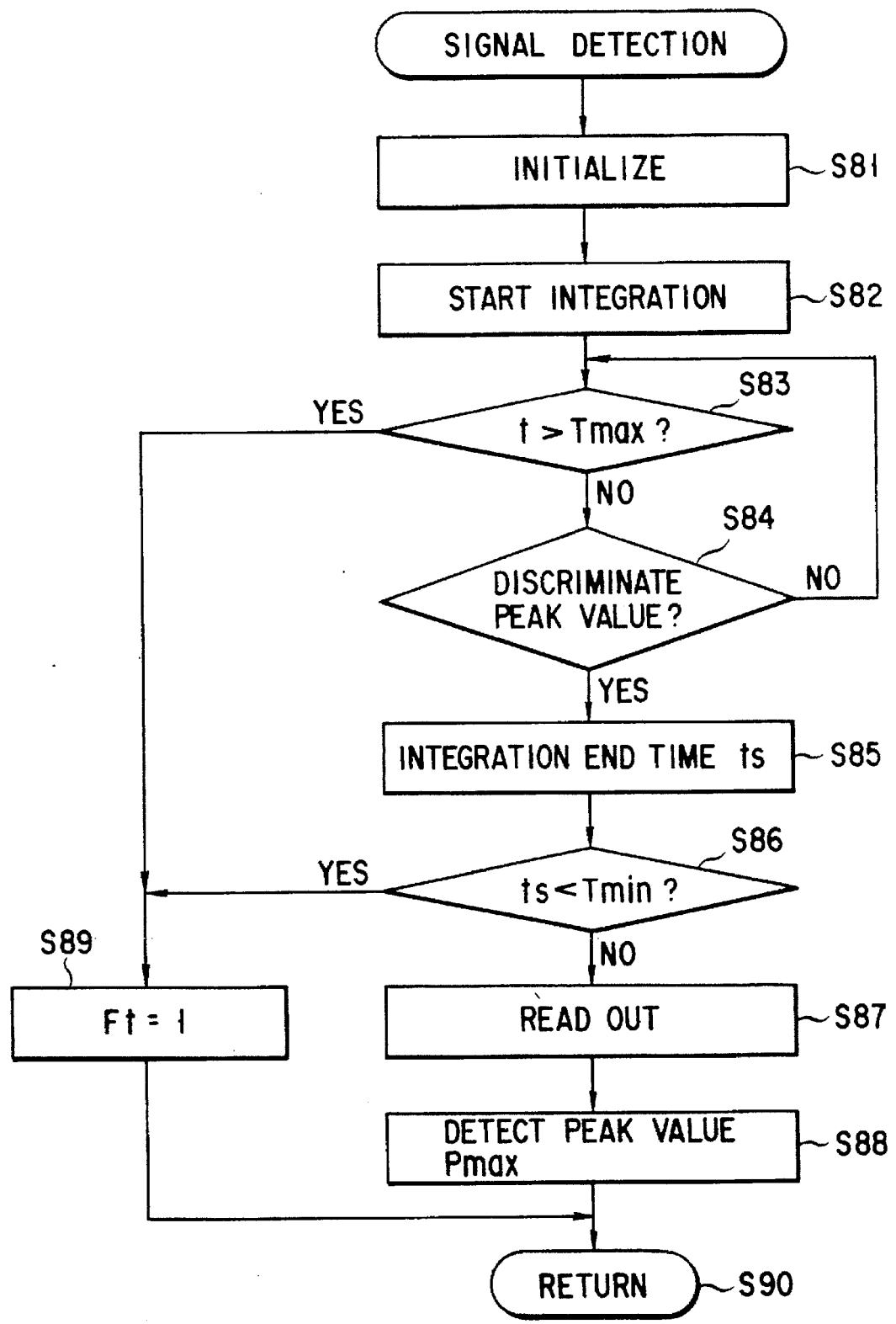
F I G. 19

CAMERA

BACKGROUND OF THE INVENTION

1. Field of the Invention

The present invention relates to a camera which comprises a finder device for controlling a finder on the basis of the visual axis information of an operator.

2. Description of the Related Art

Conventionally, when an operator inputs various kinds of information to a camera, he or she attains this operation by operating a corresponding dial, button, or the like. Therefore, as the number of pieces of information to be input increases, the operation environment becomes more complicated for an operator.

In consideration of this problem, a large number of techniques for detecting, e.g., the visual axis direction of an operator who looks into a finder, and inputting various kinds of information to a camera on the basis of the information of the visual axis direction are disclosed in, e.g., Jpn. Pat. Appln. KOKAI Publication Nos. 63-194237, 3-87818, and the like.

As for the visual axis detection methods, a large number of techniques for detecting the visual axis direction of an operator using light reflected by at least one of the cornea, iris, pupil, sclera (the white of the eye), and the like of the operator's eye are disclosed in Jpn. Pat. Appln. KOKAI Publication No. 2-206425, and the like. Furthermore, a large number of techniques for determining distance measurement information on the basis of the detected visual axis position are disclosed in Jpn. Pat. Appln. KOKAI Publication Nos. 4-307506, 5-88075, and the like.

In signal processing of a sensor as well, differential processing of signals in ON and OFF states is often performed in synchronism with operation of a light projection LED. For example, Jpn. Pat. Appln. KOKAI Publication No. 2-138673 discloses a method of performing pupil detection by performing differential processing of signals obtained based on light beams projected from different positions, i.e., a red-eye position and a non-red-eye position.

On the other hand, in a diopter adjustment technique, a technique for changing the diopter state in correspondence with distance measurement information is known to those who are skilled in the art. Furthermore, a technique associated with a camera for detecting and correcting the imaging state of an eye is disclosed in Jpn. Pat. Appln. KOKAI Publication No. 63-206731. As a method of detecting the imaging state of an eye, a method of observing the retina on the fundus of the eye is disclosed in the magazine, "O plus E., No. 115, Jun, 1989, pp. 123–125, Physiological Optics, 2nd Volume". As one of objective methods for detecting the imaging state of an eye on the basis of the state of fundus light, the skiascopy is known, in which a feature is produced in a red-eye phenomenon of reflected light depending on the light source position for projecting light.

Compact cameras popularly adopt real-image finders. Therefore, when the objective optical system and the eyepiece optical system are not in an in-focus state, an in-focus image cannot be obtained. More specifically, in the real-image finder, since the imaging position is fixed, if the observation position of an operator is other than a setting position, the operator observes an object by using his or her focus adjustment faculty. Therefore, when the focus adjustment faculty of the operator's eye is low, the operator observes an object in an out-of-focus state, i.e., an out-of-focus image.

Furthermore, diopter adjustment is normally attained by driving an optical system to a setting position with reference to a predetermined display in a finder. However, in the real-image finder, an object image is often imaged at a position other than the setting position depending on its distance. When, especially, an objective optical system in a finder optical system is driven to correct the imaging position to be an optimal setting position, an operator can no longer follow the change in frame, and cannot comfortably use the camera.

Furthermore, in the case of a finder of a camera, both near and far objects are often present, and even when some correction is performed based on distance measurement information, the observation portion of an operator does not always match the corrected position.

In order to solve these problems, a technique for adjusting the diopter by moving, especially, the objective optical system in the finder optical system on the basis of distance measurement information has been studied. In this technique, the observation state in the finder can be further improved if the visual axis direction of an operator is detected.

Note that the techniques associated with a visual axis detection system have already been put into practical applications such as in selection of distance measurement information. Furthermore, the techniques for improving the observation state in the finder by changing the diopter by moving a portion of the finder optical system have already been put into practical applications. In addition, in association with a plain finder, i.e., a real-image finder, the technique for driving a portion of the finder optical system on the basis of diopter information has been studied. However, since objects with different distances are often recognized simultaneously in the finder, if a portion of the finder optical system is driven based on specific distance measurement information, an object which an operator wants to observe may become out of focus.

Since an operator observes an object image via the finder optical system and an optical system which can adjust the focusing state of the eye, if a portion of only the finder optical system side is driven to an optimal position on the basis of distance measurement information obtained by measuring the object distance, the operator's focus adjustment faculty cannot follow this movement, resulting in an unnatural finder image.

Furthermore, upon driving the optical system, the in-focus position fluctuates around the optimal position, and a finder image becomes more unnatural.

SUMMARY OF THE INVENTION

The present invention has been made in consideration of the above-mentioned problems, and has as its object to provide a camera which can improve the observation state in a finder by moving a portion of a finder optical system on the basis of the visual axis information of an operator and distance measurement information corresponding to the visual axis information.

More specifically, a camera with a diopter adjustable finder device comprises a visual axis detection unit for detecting the visual axis direction and the fundus imaging state of an observer, a multi-distance measurement unit for measuring distances to a plurality of positions in a photographing frame, a diopter driving unit for adjusting the imaging position, and a diopter controller for driving the diopter driving unit in accordance with the outputs from the visual axis detection unit and the multi-distance measurement unit, thereby improving the observation state in a finder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 16A is a circuit diagram showing the arrangement of a line sensor according to the third embodiment, and FIG. 16B is a circuit diagram showing the internal structure of a BS;

FIG. 19 is a flow chart showing the sequence of a "signal detection" subroutine according to the third embodiment;

DETAILED DESCRIPTION OF THE PREFERRED EMBODIMENTS

Prior to the description of the embodiments of the present invention, the principle of visual axis detection adopted in this invention will be explained below. Various methods for detecting the visual axis direction of an operator are available. In the following description, a method of detecting the visual axis direction using a cornea reflected image called a first Purkinje image and a reflected image of the fundus of the eye, or the edge of the iris will be briefly described below. This method is well known to those who are skilled in the art as a method applicable to a camera. Note that a structural description will be omitted here since it is known to those who are skilled in the art.

Figure 2:
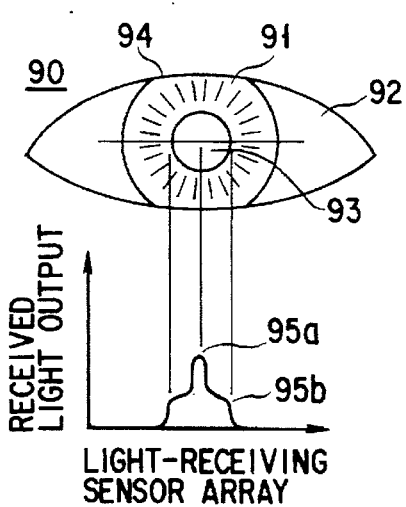
FIG. 2 is a graph showing the received-light output upon reception of a light beam projected from the optical axis and reflected by the eye.

FIG. 2 is a graph showing the received-light output upon reception of a light beam projected from, e.g., an LED on the optical axis and reflected by the eye. When an LED projects light toward an eyeball (not shown), and an image reflected by the eyeball is received, a first Purkinje image with a high received-light output is difficult to detect since it has a low reflected light amount, and the reflected image is formed at a different position.

A fundus image is detected as the silhouette of an iris edge 94 as a peripheral image of a pupil 93 on the basis of light 95b reflected by the fundus of the eye upon projection of light to an eyeball 90. This image 95b reflected by the fundus of the eye is illustrated in FIG. 2 together with a first Purkinje image 95a, and in this method, the visual axis direction is detected using these two images. Note that reference numeral 91 denotes an iris; 92, a sclera (the white of the eye); 93, the pupil; and 94, the iris edge.

Figures 3A, 3B:
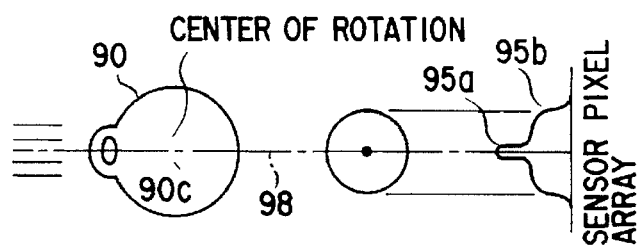
FIG. 3A is a side view of an eyeball that looks in the front direction.
FIG. 3B is a graph showing the detection signal associated with a reflected image of the eyeball that looks in the front direction.
Figures 3C, 3D:
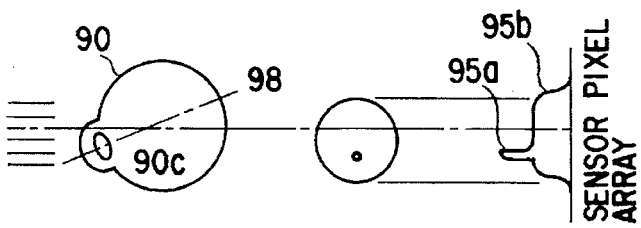
FIG. 3C is a side view of the eyeball that rotates.
FIG. 3D is a graph showing the detection signal associated with a reflected image obtained when the eyeball rotates.

A change in detected image upon rotation of the eyeball will be explained below with reference to FIGS. 3A to 3D. When an optical axis 98 of the eyeball 90 is parallel to a light beam projected onto the eye, as shown in FIG. 3A, the center of the fundus image 95b, i.e., the center of the pupil coincides with the center of the first Purkinje image 95a, as shown in FIG. 3B. When the eyeball 90 rotates, as shown in FIG. 3C, the optical axis 98 rotates about a center 90c of rotation of the eyeball 90. In this case, as shown in FIG. 3D, the center of the fundus image 95b is received at a different position on a sensor pixel array, which receives light reflected by the eye. Furthermore, the center of the first Purkinje image 95a is received at a position relatively different from the center of the fundus image 95b, since the center of the curved surface as the front surface of the cornea is different from the center of rotation of the eyeball.

Therefore, the rotation amount and shift amount of the eyeball 90 of an operator who looks into a finder can be obtained, and furthermore, the observation position of the operator can be determined on the basis of the shift between the absolute positions of the two images with respect to the sensor pixel array, and the relative shift between the two images. In the present invention, detection is made using at least one of the cornea reflected image 95a and the fundus reflected image 95b from the visual axis detection image.

Figures 4A, 4B:
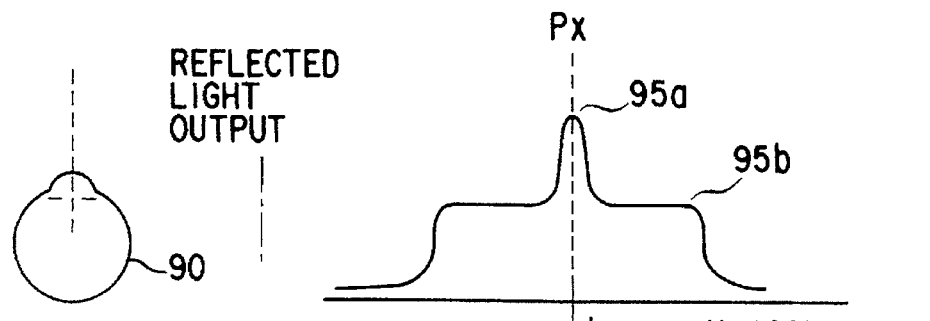
FIG. 4A is a top view of the eyeball that looks in the front direction.
FIG. 4B is a graph showing the detection signal associated with a reflected image of the eyeball that looks in the front direction.
Figures 4C, 4D:
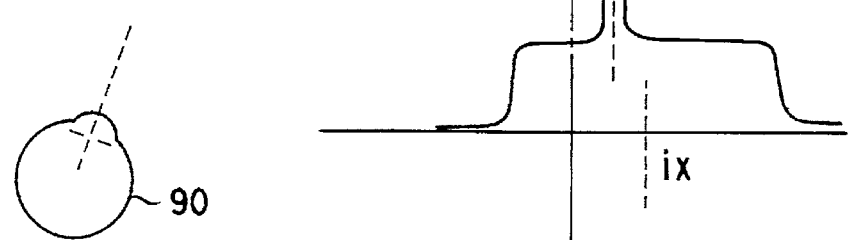
FIG. 4C is a top view of the eyeball that looks in the right direction.
FIG. 4D is a graph showing the detection signal associated with a reflected image of the eyeball that looks in the right direction.
Figures 4E, 4F:
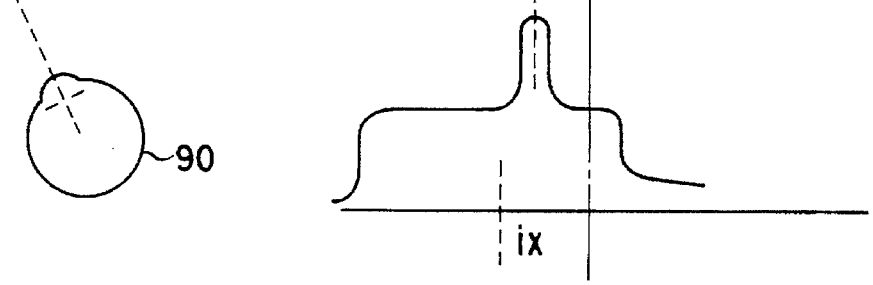
FIG. 4E is a top view of the eyeball that looks in the left direction.
FIG. 4F is a graph showing the detection signal associated with a reflected image of the eyeball that looks in the left direction.

Changes in cornea reflected image 95a and fundus reflected image 95b upon rotation of the eyeball 90 when the center of the eyeball is fixed in position will be explained below with reference to FIGS. 4A to 4F. When viewed from the center of the finder, FIG. 4A shows the state of the rotation angle=0 (reference), i.e., a state wherein the operator looks at the center, FIG. 4C shows the state of the rotation angle=negative, i.e., a state wherein the operator looks in the left direction, and FIG. 4E shows the state of the rotation angle=positive, i.e., a state wherein the operator looks in the right direction. FIGS. 4B, 4D, and 4F show the detection signals in these states. Note that px is the barycentric position of the cornea reflected image 95a, and ix is the barycentric position of the fundus reflected image.

If the center of the eyeball is fixed in position, the rotation angle can be detected by detecting only one of the barycentric position ix of the fundus reflected image 95b and the barycentric position px of the cornea reflected image 95a, or the barycentric position including the two images. The detection signal associated with the fundus reflected image shown in FIGS. 4B, 4D, and 4D generally represents a so-called "red-eye state" which includes many light components reflected by the fundus of the eye. When the iris is stopped down in a bright state or when the red-eye state does not occur, i.e., when reflected light does not return to a light-receiving system, the output of the fundus reflected image 95b is further lowered.

Figures 5A, 5B:
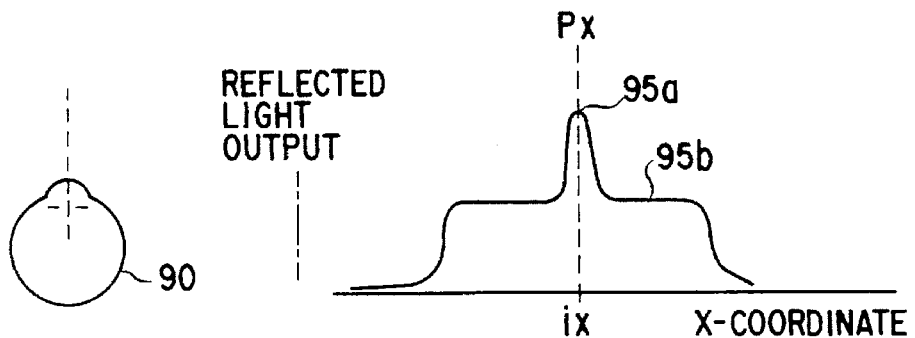
FIG. 5A is a top view of the eyeball located at a normal position.
FIG. 5B is a graph showing the detection signal associated with a reflected image of the eyeball located at the normal position.
Figures 5C, 5D:
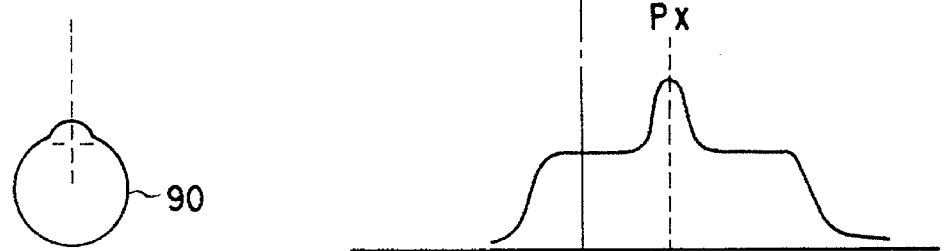
FIG. 5C is a top view of the eyeball shifted in the right direction.
FIG. 5D is a graph showing the detection signal associated with a reflected image of the eyeball shifted in the right direction.
Figures 5E, 5F:
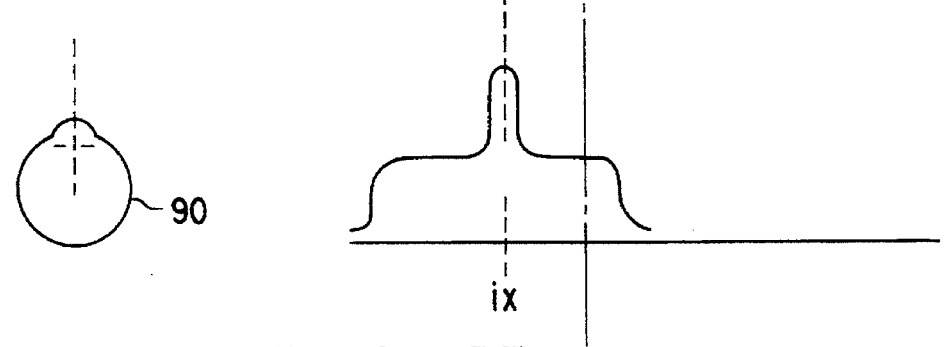
FIG. 5E is a top view of the eyeball shifted in the left direction.
FIG. 5F is a graph showing the detection signal associated with a reflected image of the eyeball shifted in the left direction.

Changes in cornea reflected image 95a and fundus reflected image 95b upon shift of the eyeball 90 will be explained below with reference to FIGS. 5A to 5F. The shift amount can be roughly detected by detecting only one of the barycentric position ix of the fundus reflected image 95b and the barycentric position px of the cornea reflected image 95a, or the barycentric position including the two images. In FIGS. 5A to 5F, px is the barycentric position of the cornea reflected image 95a, and ix is the barycentric position of the fundus reflected image 95b. As in FIGS. 4B, 4D, and 4F above, the fundus reflected image shown in FIGS. 5B, 5D, and 5F represents a red-eye state, and the output of the fundus reflected image 95b is further lowered when the red-eye state does not occur. When viewed from the center of the finders, FIG. 5A shows the state of the shift amount=0 (reference), i.e., a state wherein the operator looks at the center, FIG. 5C shows the state of the shift amount= negative, i.e., a state wherein the operator looks in the left direction, and FIG. 5E shows the state of the shift amount= positive, i.e., a state wherein the operator looks in the right direction.

In general, in a single shutter sequence, i.e., from a timing before or after the 1st release operation until the 2nd release operation, the shift amount of the eye does not change so largely, and the observation direction of the operator can be detected by detecting the relative movement of the eye and its reference position. The reference position is preferably detected in the sequence.

An embodiment of the present invention based on the above-mentioned principle will be described below.

Figure 1:
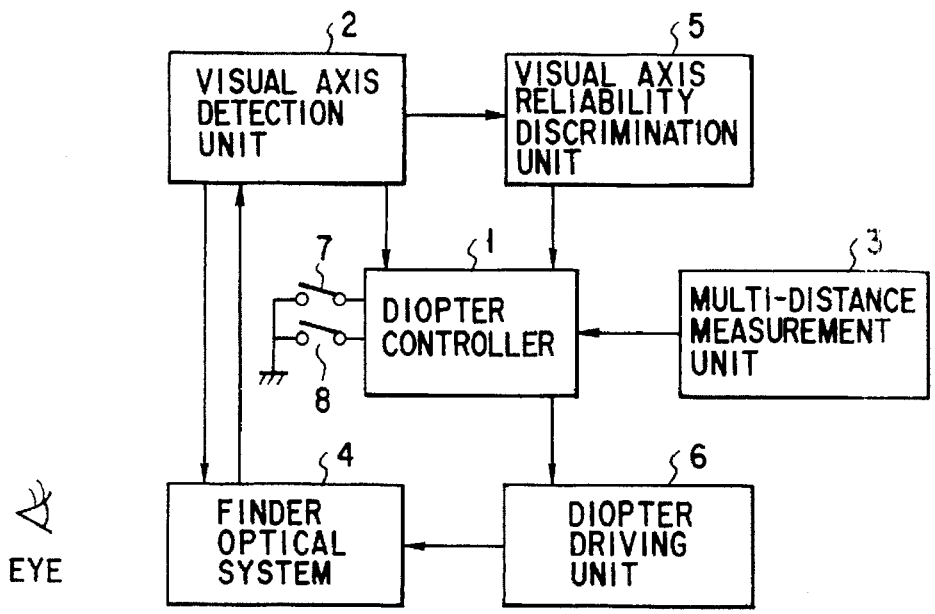
FIG. 1 is a block diagram showing the arrangement of a camera according to the first embodiment of the present invention.

FIG. 1 is a block diagram showing the arrangement of a camera according to the first embodiment of the present invention.

In the first embodiment, a diopter correction of an eyepiece optical system is performed in advance. The diopter correction in the sequence is performed by only an objective optical system, so that objects of different distances are always imaged at a predetermined position in a finder optical system. That is, since the distance distribution of objects in the finder is not always uniform, out-of-focus objects are present when the imaging position is fixed. In consideration of this situation, a visual axis detection unit discriminates a principal object, and the objective optical system of the finder is corrected by distance information corresponding to the discriminated object, thereby correcting the imaging position.

As shown in FIG. 1, a finder optical system 4 with a diopter adjustment optical system which can vary the diopter state is connected to a visual axis detection unit 2 and a diopter driving unit 6 for driving the diopter adjustment optical system. The visual axis detection unit 2, which detects the visual axis direction of an operator on the basis of feature signals of his or her eye, is connected to the finder optical system 4, a visual axis reliability discrimination unit 5 for discriminating the reliability of a visual axis signal detected by the visual axis detection unit 2, and a diopter controller 1. A multi-distance measurement unit 3 for measuring distances to a plurality of points of an image in the finder is connected to the diopter controller 1. The diopter controller 1 is connected to the visual axis detection unit 2, the visual axis reliability discrimination unit 5, the multi-distance measurement unit 3, and the diopter driving unit 6.

In this arrangement, the multi-distance measurement unit 3 measures distances to a plurality of points in the finder, and supplies distance measurement information to the diopter controller 1. The visual axis detection unit 2 detects the visual axis direction of the operator directed to the finder on the basis of feature signals of the eye, and supplies visual axis information to the diopter controller 1. The visual axis reliability discrimination unit 5 performs reliability discrimination, i.e., discriminates whether or not the detected visual axis information is normal (blinking, the visual axis of the operator is not directed to a position in the finder, the S/N ratio is extremely lows and so on), and supplies reliability information to the diopter controller 1. The diopter controller 1 sets a diopter correction range or focus adjustment range (within which an object image can be observed at a predetermined focus adjustment level or higher) of the diopter adjustment optical system of the finder optical system 4 on the basis of the distance measurement information from the multi-distance measurement unit 3, the visual axis information from the visual axis detection unit 2, and the reliability information from the visual axis reliability discrimination unit 5, and controls the diopter driving unit 6 to drive the diopter adjustment optical system. When the reliability is low, the driving position of the optical system is set at a predetermined position (a position determined by distance measurement information selected by the multi-distance measurement unit). The set diopter correction range has a predetermined width around the optimal position, and the driving operation of the diopter adjustment optical system is stopped at a position falling within the diopter correction range, and where the driving amount has a smallest change amount from the diopter state before the driving operation.

Figure 6:
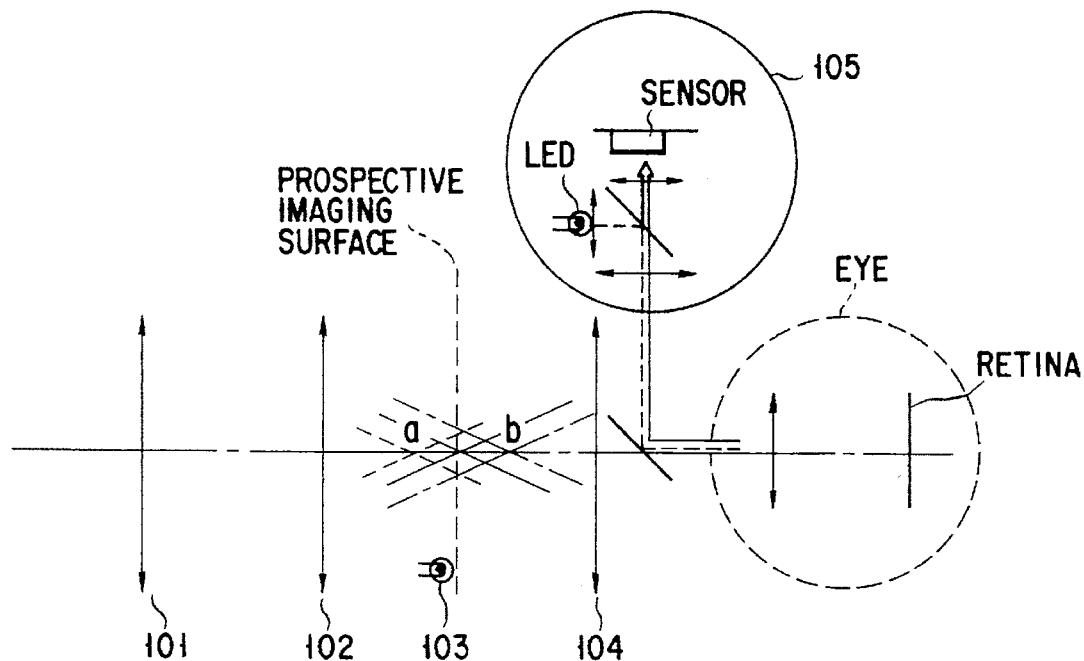
FIG. 6 is a view showing the arrangement of a finder optical system 4 in the first embodiment.

FIG. 6 shows the arrangement of the finder optical system 4.

The finder optical system 4 is constituted by a magnification (objective) optical system 101 for changing the magnification of the finder, a diopter adjustment (objective) optical system (diopter A) 102 (diopter correction means) of an objective system, a display unit 103 set at the prospective imaging surface, a diopter adjustment (eyepiece) optical system (diopter B) 104 (diopter correction means) of an eyepiece system, and an optical system 105 for visual axis detection. Since the magnification of the finder changes in correspondence with the driving operation of the diopter adjustment optical system (diopter A) 102, its change amount is corrected by the magnification optical system 101. In a camera with a zoom finder, a change in magnification is preferably corrected by a single optical system. A primary imaging position of the finder device where an object image is focused by an objective optical system is indicated by "a" and "b" (FIG. 6).

Figure 7:
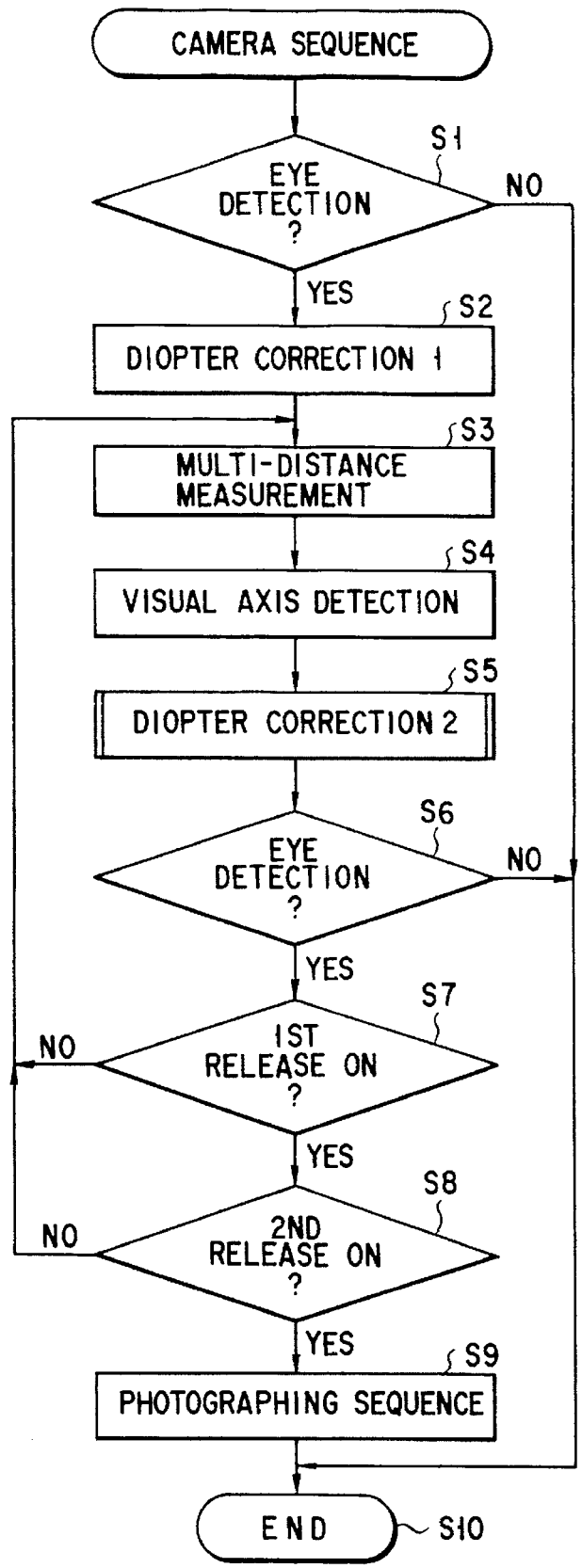
FIG. 7 is a flow chart showing the camera sequence of the first embodiment.

The operation of the first embodiment will be described below with reference to the flow chart shown in FIG. 7.

When this sequence is started, the diopter controller 1 detects if the operator holds the camera in front of his or her face (eye detection; step S1). This detection technique is disclosed in Jpn. Pat. Appln. KOKAI Publication No. 4-56935, and the like. If N (NO) in step S1, the flow jumps to step S10.

On the other hand, if Y (YES) in step S1, diopter correction (diopter correction 1) of the eyepiece optical system side is manually performed while confirming a display on the display unit 103 in the finder (step 2). The multi-distance measurement unit 3 performs multi-distance measurement (step S3), and the visual axis detection unit 2 performs visual axis detection (step S4). Then, the sequence of a "diopter correction 2" subroutine (to be described later) is executed to perform diopter correction based on the distance measurement information and the visual axis information (step S5). The diopter controller 1 performs eye detection again (step S6). If N in step S6, the flow jumps to step S10.

On the other hand, if Y in step S6, the ON/OFF states of 1st and 2nd release switches 7 and 8 are discriminated (steps S7 and S8). If the 1st release switch 7 is OFF, or if the 2nd release switch 8 is OFF, the flow returns to step S3. However, if the 1st and 2nd release switches 7 and 8 are ON, a photographing sequence (lens driving, exposure, winding, and the like) is performed (step S9), thus ending this sequence (step S10).

Figure 8:
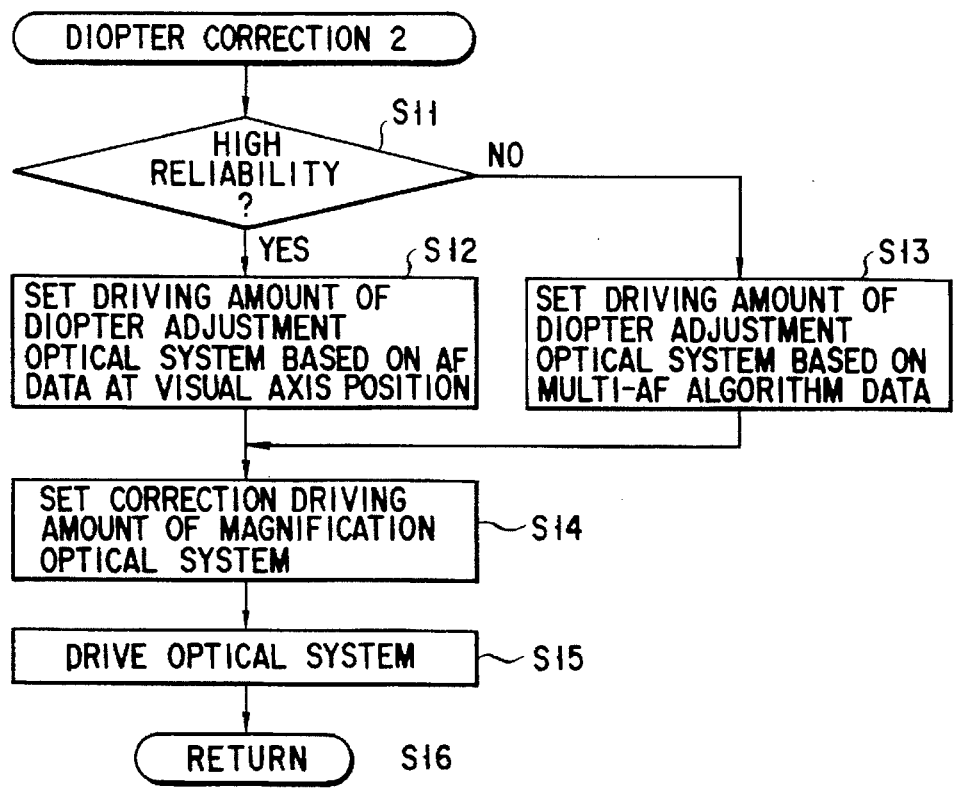
FIG. 8 is a flow chart showing the sequence of a "diopter correction 2" subroutine according to the first embodiment.

The sequence of the "diopter correction 2" subroutine will be described below with reference to the flow chart in FIG. 8. When the "diopter correction 2" subroutine is started, the diopter controller 1 discriminates the reliability of the visual axis information (step S11). If it is determined that the reliability is low, the driving amount of the diopter adjustment optical system 102 of the objective system is set in correspondence with distance information determined based on multi-AF data (step S13), and the flow advances to step S14. On the other hand, if it is determined that the reliability is high, the driving amount of the diopter adjustment optical system 102 of the objective system is set in correspondence with distance measurement information corresponding to the visual axis position (step S12). Furthermore, the correction amount of the magnification optical system 101 is set so as not to change the magnification (step S14), and the respective optical systems are driven (step S15). Thereafter, the control ends this sequence (step S16).

As described above, according to the first embodiment, since the diopter correction is performed based on distance measurement information corresponding to visual axis information, a finder image in which an object at the observation position of the operator is always in focus can be obtained. In the first embodiment, the sequence is started by the eye detection, but may be started in synchronism with the ON operation of the 1st release switch 7. The distance measurement may be performed periodically, and the diopter optical system may be driven based on new distance measurement information. When the reliability is low, the optical system may be fixed at an initial position.

Figure 9:
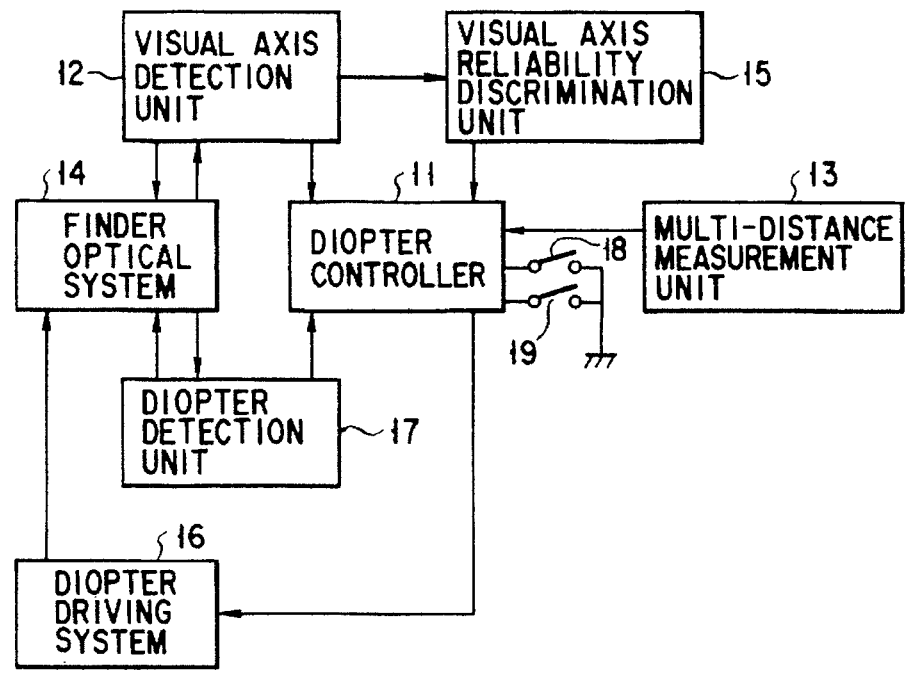
FIG. 9 is a block diagram showing the arrangement of a camera according to the second embodiment of the present invention.

FIG. 9 shows the arrangement of a finder device according to the second embodiment, and this finder device will be described below.

In the second embodiment, the diopter state is detected, and only a diopter optical system of an eyepiece system is driven for correction. As in the first embodiment, the imaging position of an object which is gazed by an operator is obtained by a visual axis detection unit 12 and a multi-distance measurement unit 13, the imaging state (diopter value) of an eye is detected by a diopter detection unit 17, and the imaging position of the finder is corrected by moving an eyepiece optical system.

As shown in FIG. 9, a finder optical system 14 with a diopter adjustment optical system which can vary the diopter state is connected to the visual axis detection unit 12, the diopter detection unit 17, and a diopter driving unit 16 for driving the diopter adjustment optical system. The visual axis detection unit 12 for detecting the visual axis direction on the basis of feature signals of the eye of an operator is connected to the finder optical system 14, a visual axis reliability discrimination unit 15 for discriminating the reliability of a visual axis signal detected by the visual axis detection unit 12, and a diopter controller 11. The diopter detection unit 17 for detecting the imaging state of the eye of an operator is connected to the finder optical system 14 and the diopter controller 11. The multi-distance measurement unit 13 for measuring distances to a plurality of points on an image in the finder is connected to the diopter controller 11. The diopter controller 11 is connected to the visual (axis detection unit 12, the diopter detection unit 17, the visual axis reliability discrimination unit 15, the multi-distance measurement unit 13, and the diopter driving unit 16.

In this arrangement, the multi-distance measurement unit 13 measures distances to a plurality of points in the finder, and supplies distance measurement information to the diopter controller 11. The visual axis detection unit 12 detects the direction of the visual axis directed to a position in the finder on the basis of feature signals of the eye of an operator, and supplies visual axis information to the diopter controller 11. The visual axis reliability discrimination unit 15 performs reliability discrimination, i.e., discriminates whether or not the detected visual axis information is normal (blinking, the visual axis of the operator is not directed to a position in the finder, the S/N ratio is extremely low, and so on), and supplies reliability information to the diopter controller 11. The diopter detection unit 17 detects the imaging state of the eye of the operator, and supplies information associated with the detected imaging state to the diopter controller 11. The diopter controller 11 sets a diopter correction range (within which an object image can be observed at a predetermined focus adjustment level or higher) of the diopter adjustment optical system of the finder optical system 14 on the basis of the distance measurement information from the multi-distance measurement unit 13, the visual axis information from the visual axis detection unit 12, the reliability information from the visual axis reliability discrimination unit 15, and the information associated with the imaging state of the eye of the operator from the diopter detection unit 17, and controls the diopter driving unit 16 to drive the diopter adjustment optical system. When the reliability is low, the driving position of the optical system is set at a predetermined position (a position determined by distance measurement information selected by the multi-distance measurement unit). The set diopter correction range has a predetermined width around the optimal position, and the driving operation of the diopter adjustment optical system is stopped at a position falling within the diopter correction range, and where the driving amount has a smallest change amount from the diopter state before the driving operation.

Figure 10:
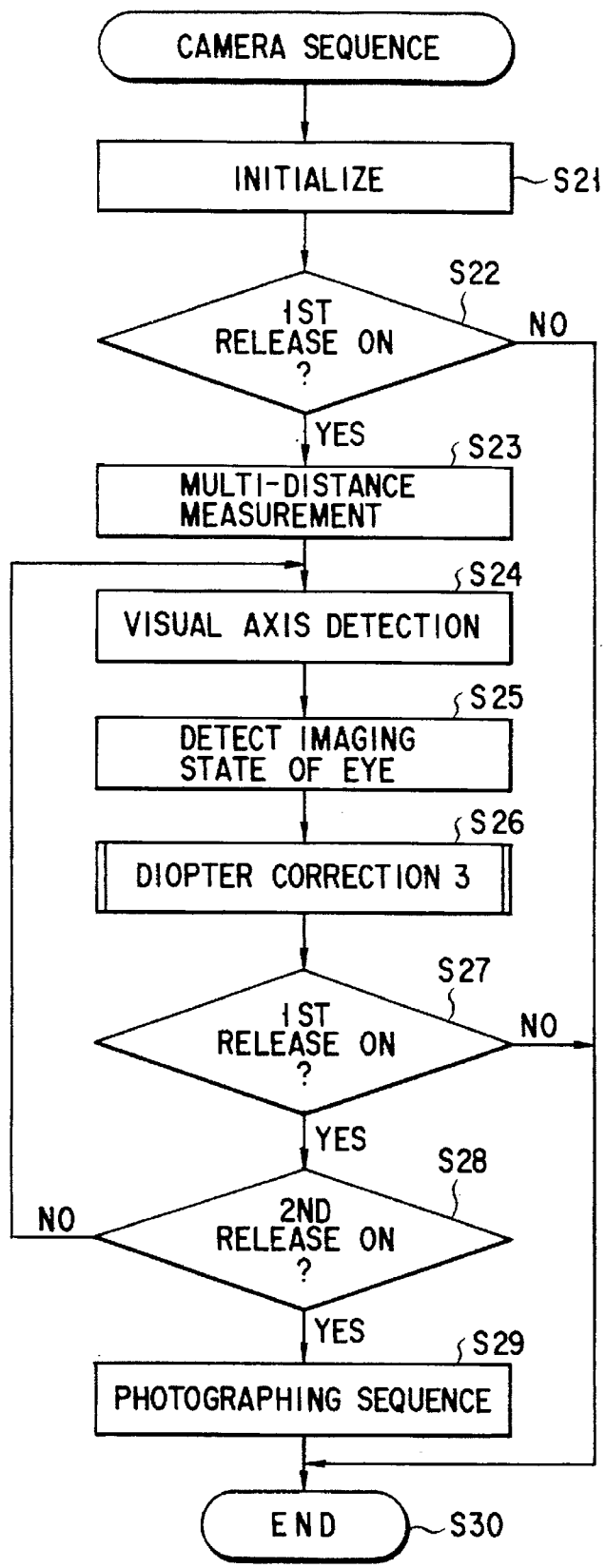
FIG. 10 is a flow chart showing the camera sequence of the second embodiment.

The operation of the second embodiment will be described below with reference to the flow chart in FIG. 10.

When this sequence is started, the diopter controller 11 performs initialization. In this case, the controller 11 sets the diopter optical system included in the finder optical system 14 at an initial position, and sets a central focus area (step S21). Subsequently, the ON/OFF state of a 1st release switch 18 is discriminated (step S22). If the 1st release switch 18 is OFF, the flow jumps to step S30; otherwise, the multi-distance measurement unit 13 performs multi-distance measurement (step S23), and the visual axis detection unit 12 performs visual axis detection (step S24), thereby detecting the imaging state of the eye of the operator (step S25). This detection method may use a technique disclosed in, e.g., Jpn. Pat. Appln. KOKAI Publication No. 63-206731 or the like.

Subsequently, the diopter controller 11 executes a "diopter correction 3" subroutine (to be described later) to perform a diopter correction of the eyepiece optical system (step S26). Then, the ON/OFF states of the 1st release switch 18 and a 2nd release switch 19 are discriminated (steps S27 and S28) upon successful eye detection. If the 1st release switch 18 is OFF, the flow jumps to step S30. If the 1st release switch 18 is ON and the 2nd release switch 19 is OFF, the flow returns to step S24. If the 1st release switch 18 is ON and the 2nd release switch 19 is ON, the diopter controller executes a photographing sequence (lens driving, exposure, winding, and the like) (step S29), thus ending this sequence (step S30).

Figure 11:
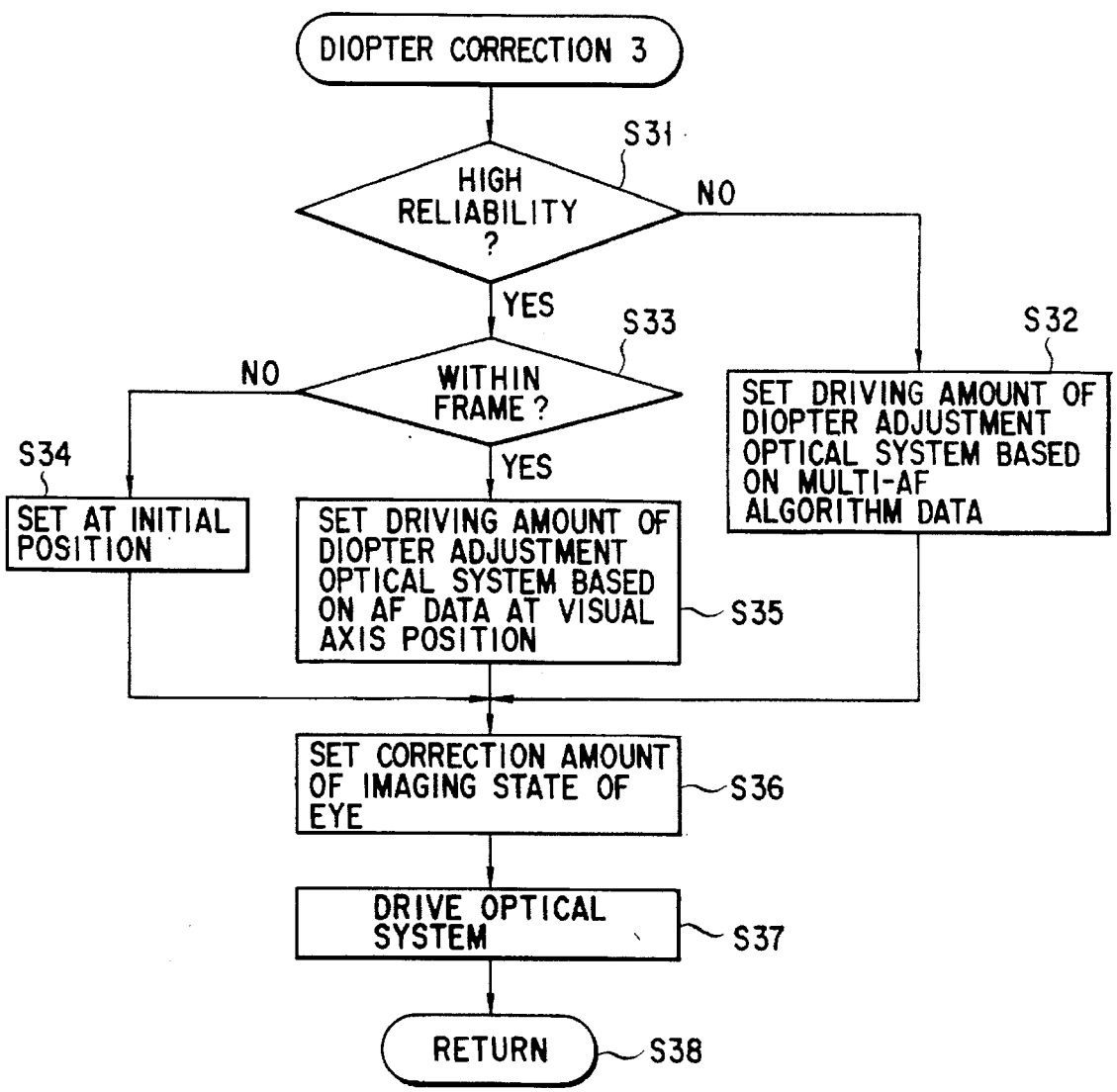
FIG. 11 is a flow chart showing the sequence of a "diopter correction 3" subroutine according to the second embodiment.

The sequence of the "diopter correction 3" subroutine will be described below with reference to the flow chart in FIG. 11. When the sequence of the "diopter correction 3" subroutine is started, the diopter controller 11 discriminates the reliability of visual axis information (step S31). If it is determined that the reliability is low, the driving amount (the shift amount from the initial position) of the diopter adjustment optical system of the eyepiece system included in the finder optical system 14 is set in correspondence with distance information determined based on multi-AF data (step S32). Thereafter, the flow advances to step S36.

On the other hand, if it is determined that the reliability is high (step S31), the diopter controller 11 discriminates if the visual axis range falls within the frame (a position outside the frame corresponds to a portion for displaying the camera state on the surrounding portion of the finder frame) (step S33). If Y in step S33, the driving amount (the shift amount from the initial position) of the diopter adjustment optical system of the objective system included in the finder optical system 14 is set in correspondence with distance measurement information corresponding to the visual axis position (step S35), and thereafter, the flow advances to step S36.

On the other hand, if N in step S33, the moving amount to the initial position (an equivalent distance of a finder display) is set (step S34). Furthermore, the correction amount (the shift amount between the imaging position of the eye and the initial position) based on the imaging state of the eye is set (step S36). The finder optical system 14 (eyepiece system) is driven based on the driving amount set in step S32, S34, or S35, and the correction amount set in step S36 (step S37). Thereafter, the control ends this sequence (step S38).

As described above, according to the second embodiment, since the diopter correction is performed based on distance measurement information corresponding to visual axis information, a finder image in which an object at the observation position of the operator is always in focus can be obtained. Furthermore, the sequence is started in response to the ON operation of the 1st release switch, but may be started in response to the eye detection like in the first embodiment, as a matter of course. Furthermore, the distance measurement may be performed periodically, and the diopter optical system may be driven based on new distance measurement information.

When the reliability is low, the optical system may be fixed at an initial position. The distance measurement information at the visual axis position and the imaging state of the eye may be detected to directly obtain a relative driving amount. When the reliability of the visual axis information is low, the diopter adjustment optical system may be driven to an intermediate position of distance information obtained by the multi-distance measurement. Furthermore, an optimal diopter position may be detected while driving the diopter adjustment optical system on the basis of distance measurement information at the visual axis position.

Figure 12:
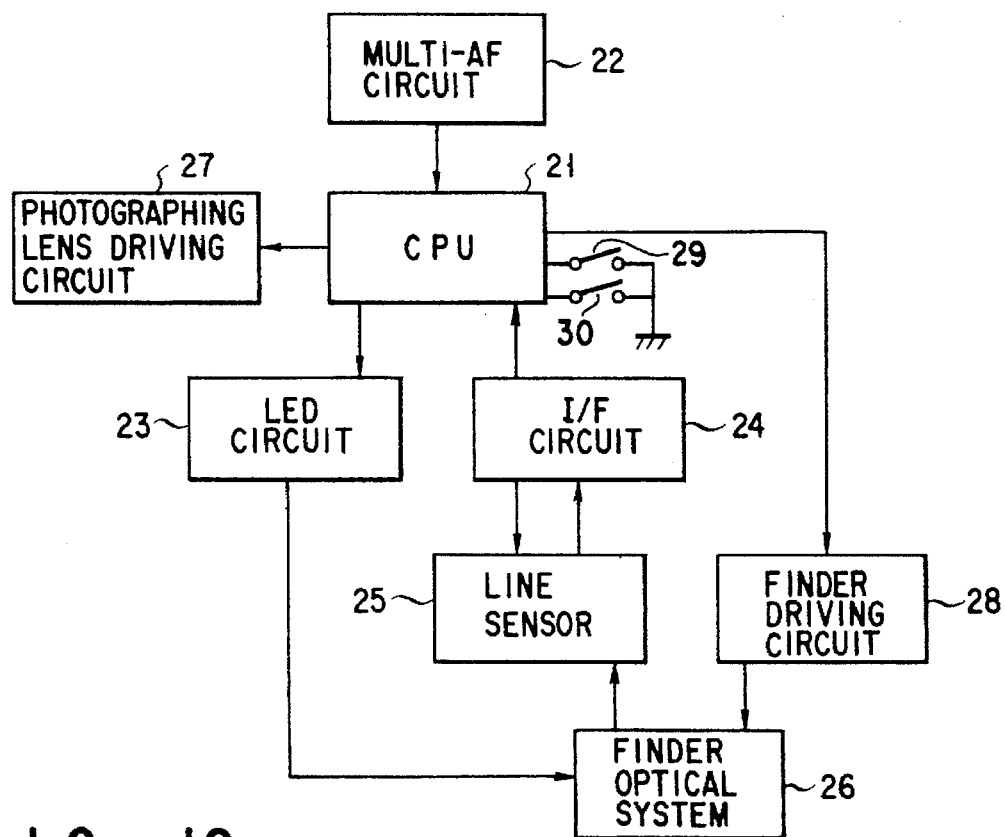
FIG. 12 is a block diagram showing the arrangement of a camera according to the third embodiment of the present invention.

FIG. 12 shows the arrangement of a camera according to the third embodiment of the present invention. The camera will be described below.

In the third embodiment, selection of a one-dimensional multi-AF focus area is realized by one-dimensional visual axis detection. A diopter detection system adopts a system for detecting a relative shift amount by utilizing the correlation between the diopter shift and generation of a red-eye image, and also serves as a visual axis detection system.

As shown in FIG. 12, an LED circuit 23 for projecting a light beam onto an eye is connected to a finder optical system 26 and a CPU 21. A line sensor 25 for receiving light reflected by the eye is connected to the finder optical system 26 and an I/F circuit 24. The I/F circuit 24 is connected to the line sensor 25 and the CPU 21. A finder driving circuit 28 is connected to the finder optical system 26 and the CPU 21. The CPU 21 is connected to the LED circuit 23 associated with visual axis detection and the I/F circuit 24, and is also connected to a multi-AF circuit 22 and a lens driving circuit 27.

In this arrangement, the LED circuit 23 controls a plurality of LEDs upon reception of a control signal from the CPU 21, so that an LED at a red-eye position (light reflected by the fundus of the eye is generated at the sensor position) and an LED at a non-red-eye position (i.e., at an intermediate position where a red-eye image may or may not be generated based on emitted light) emit light. The emitted light beam is guided to the eye via the finder optical system 26.

The line sensor 25 receives the light beam projected from the LEDs and reflected by the eye via the finder optical system 26, and supplies a detection signal to the I/F circuit 24. The I/F circuit 24 processes the signal from the line sensor 25, and supplies the processed signal to the CPU 21 as digital information. The multi-AF circuit 22 performs distance measurement at a plurality of points, and supplies distance measurement information to the CPU 21. The lens driving circuit 27 drives a lens in correspondence with a control signal from the CPU 21. The CPU 21 controls a visual axis detection system (the LED circuit 23, the I/F circuit 24, and the line sensor 25). Also, the CPU 21 detects the visual axis detection on the basis of the obtained signal, selects one of the distance measurement information from the multi-AF circuit 22, calculates the driving amount of the lens, and controls the lens driving circuit 27. Furthermore, as for the diopter, the CPU 21 drives the finder (diopter system) via the finder driving circuit 28, and controls the LED circuit 23, the I/F circuit 24, and the line sensor 25 every time it drives the finder. The CPU 21 detects the shift amount of the diopter on the basis of the obtained signal, and corrects the next position of the finder optical system 26.

Figure 13A:
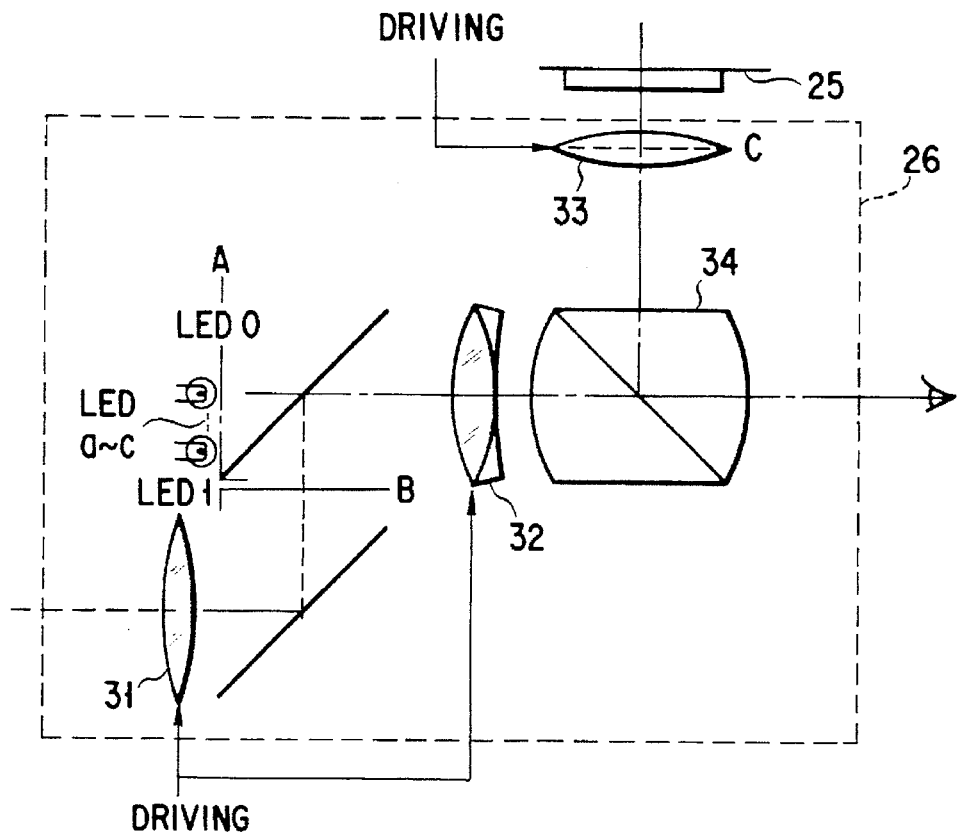
FIG. 13A is a view showing the detailed arrangement of a finder optical system.

FIG. 13A shows the optical arrangement of the visual axis detection system of the finder optical system 26. The visual axis detection system will be described below. A detection sensor comprises an accumulation type line sensor, and detects light reflected by the eye. As projection light sources, two LEDs, i.e., LED0 and LED1 are used for visual axis detection. The LED0 is arranged to generate a red-eye image on the detection line sensor, and the LED1 is arranged to project light with an angle of 2° to 5° from the light projection optical axis of the LED0 so as not to generate a red-eye image on the detection line sensor. In addition, LEDa to LEDc for visual axis detection are arranged between the LED0 and LED1. Light beams emitted by the LED0, LED1, and LEDa to LEDc are projected onto the eye via a diopter optical system 32 (diopter correction means) and a beam splitter 34, and light reflected by the eye is guided to the line sensor 25 via the beam splitter 34 and a visual axis optical system 33.

Figure 13B:
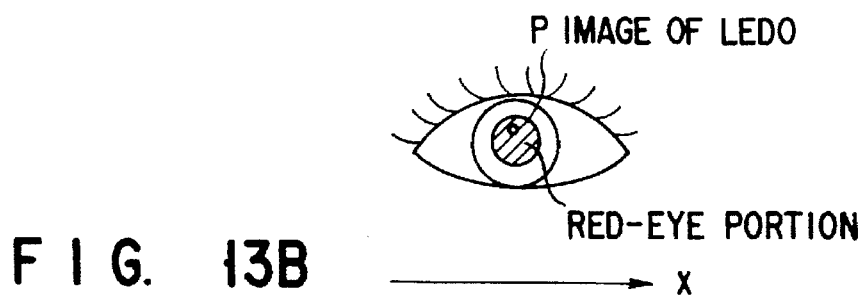
FIG. 13B is a view showing a state wherein a Purkinje image and a red-eye image are detected upon projection of light from an LED0.
Figure 13C:
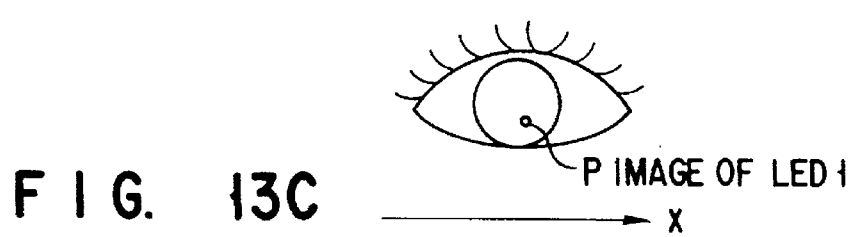
FIG. 13C is a view showing a state wherein only a Purkinje image is detected upon projection of light from an LED1.

FIGS. 13B and 13C show the states of the images of the eye upon projection of light from the LED0 and LED1.

FIG. 13B shows a state wherein a Purkinje image and a red-eye image are detected upon projection of light from the LED0. FIG. 13C shows a state wherein a Purkinje image is detected upon projection of light from the LED1, but no red-eye image is detected. The LED0 and LED1 are arranged to form Purkinje images at the same position in the x-axis direction. More specifically, the light sources are arranged at positions in a direction perpendicular to the detection direction of the Purkinje images.

Figure 14A:
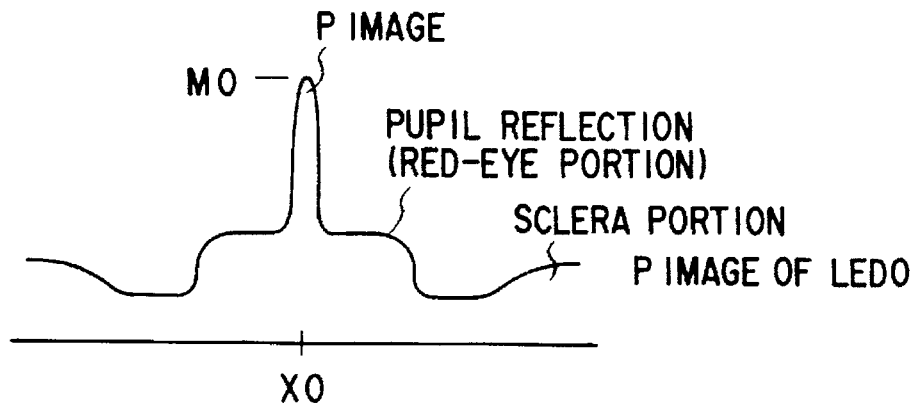
FIG. 14A is a graph showing the detection signal obtained upon projection of light from the LED0.
Figure 14B:
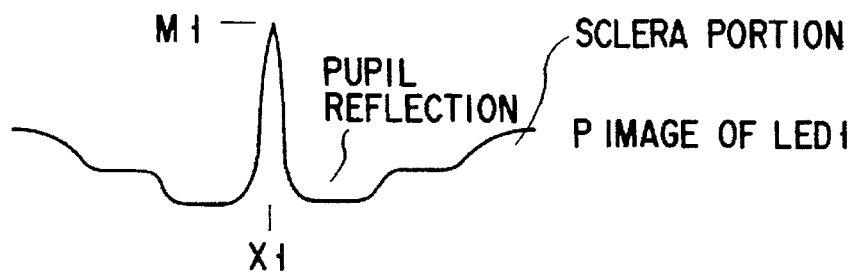
FIG. 14B is a graph showing the detection signal obtained upon projection of light from the LED1.

FIGS. 14A and 14B show signals on the line sensor in FIGS. 13B and 13C.

Figure 14C:
FIG. 14C is a graph showing the differential processing results of the detection signals obtained upon projection of light from the LED0 and LED1.

FIG. 14C shows a state after the differential processing of the signals in FIGS. 14A and 14B. In FIG. 14C, only a red-eye image is extracted. Furthermore, from the image shown in FIG. 14C, the barycentric position of the red-eye image (that of the pupil) and a MAX value (Purkinje image position) can be detected, and the visual axis direction can be determined.

Figure 15A:
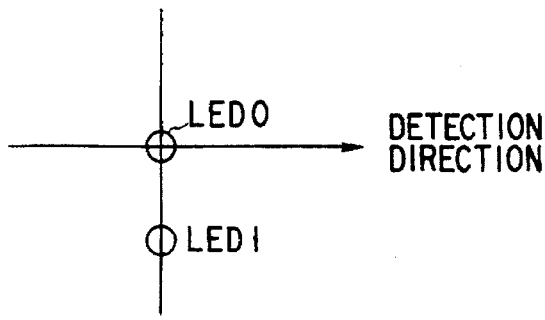
FIG. 15A is a view showing a state wherein the two LED0 and LED1 are arranged in a direction perpendicular to the detection direction.
Figure 15B:
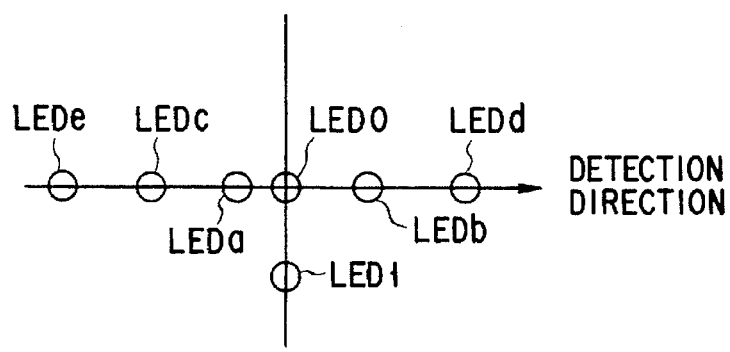
FIG. 15B is view showing a state wherein the two LED0 and LED1 are arranged in the direction perpendicular to the detection direction, and LEDa to LEDe are arranged in the direction perpendicular to the detection direction.
Figure 15C:
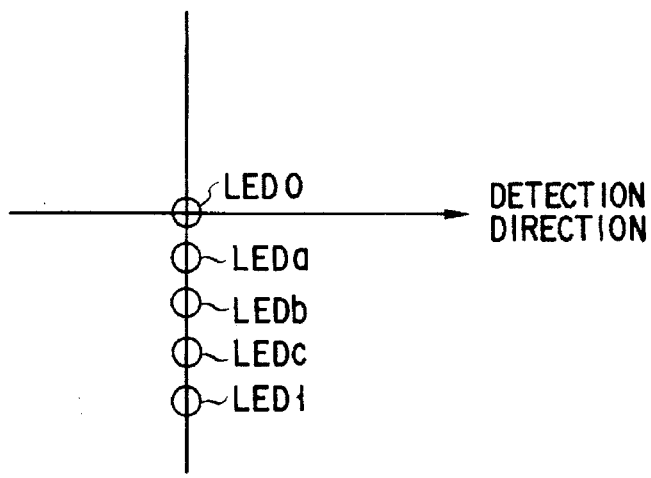
FIG. 15C is a view showing a state wherein the five LEDa to LEDe are arranged in the direction perpendicular to the detection direction.

FIGS. 15A to 15C show the arrangement states of the LEDs. More specifically, FIG. 15A shows the LED0 and LED1 which are used for detecting the visual axis direction. FIG. 15C shows a state wherein the LEDa to LEDc used for detecting the degree of generation of a red-eye image are arranged between the LED0 and LED1. Furthermore, FIG. 15B shows a state wherein the LEDa to LEDc used for detecting the degree of generation of a red-eye image are arranged along the detection direction.

FIG. 16A shows the arrangement of the line sensor. A DBS is a fundamental block for shielding BSs and correcting any dark current. A shift register controls to drive the BSs in accordance with a control signal from a KCPU (not shown). The BSs are integration-controlled by control signals (T) and (C) from the KCPU and monitor signals (M) output from themselves. In the integration control, peak value detection (a signal for ending integration is output when one of the BSs has reached a predetermined level) and time control are performed. The signal (M) is recorded in the KCPU, is held as the signal (T) until the next integration is started, and holds the signal (C). After a dark current differential component is eliminated from the image of the eye, the image signal is amplified, and is then supplied to an A/D circuit of the KCPU. The integration control time is determined by the brightest state (upon generation of a red-eye image), and the integration time upon non-generation of a red-eye image is determined by the control signal (T) on the basis of the integration time upon generation of a red-eye image.

FIG. 16B shows the internal circuit of each BS. As shown in FIG. 16B, light is photoelectrically converted by a PD, and the converted signal is accumulated on a capacitor C via an integration control gate G02. A gate G01 resets the PD and the capacitor C together with the gate G02. A gate G03 performs read-out amplification, a gate G04 reads out a signal in accordance with a signal from the shift register, and a diode D01 performs peak value detection.

Figure 17:
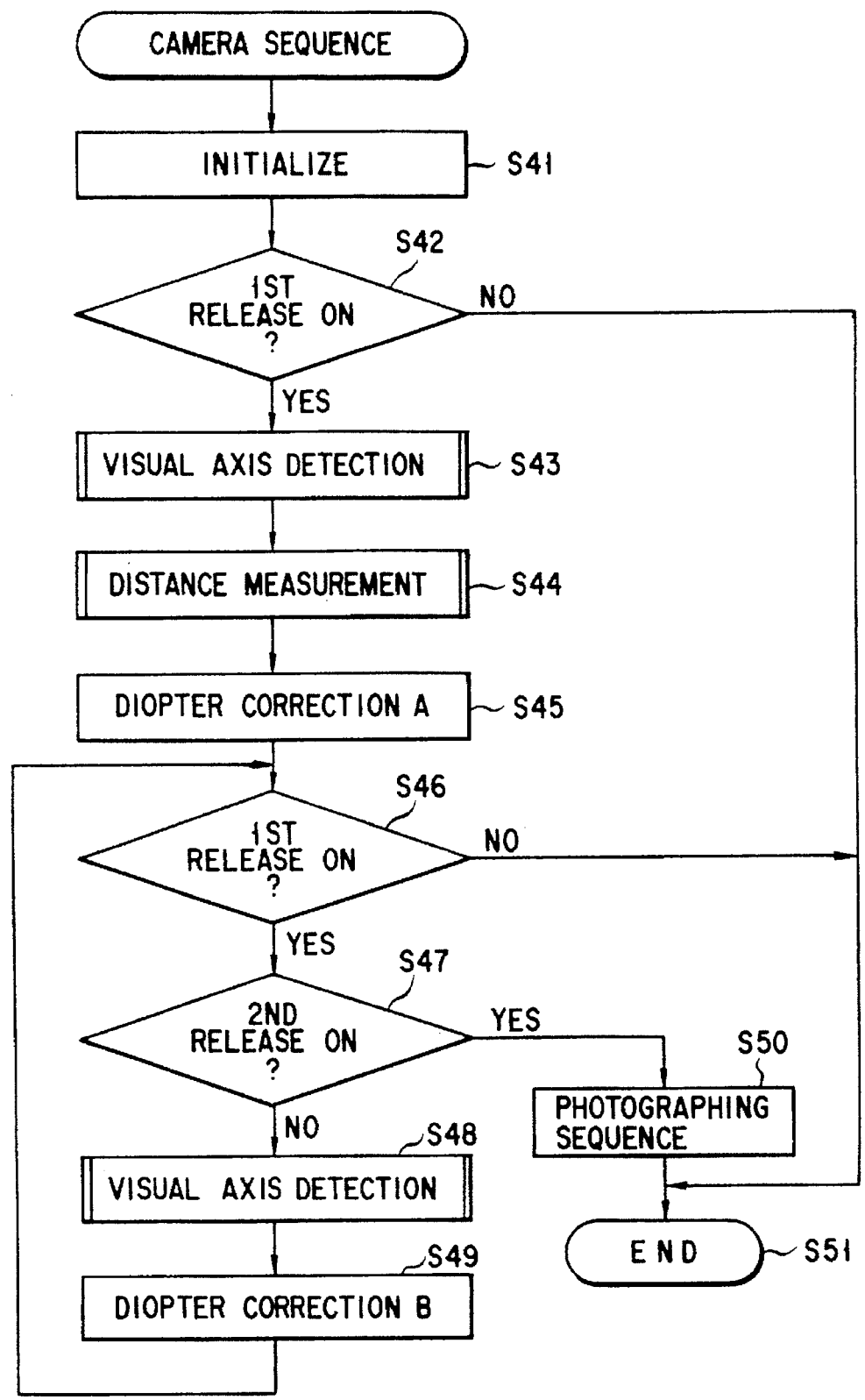
FIG. 17 is a flow chart showing the camera sequence of the third embodiment.

The operation of the third embodiment will be described below with reference to the flow chart in FIG. 17.

When this sequence is started, the CPU 21 performs initialization first. In this case, the CPU 21 sets a central focus area, and sets the diopter in an initial state, i.e., at a display equivalent distance of the finder (step S41). The CPU 21 discriminates the state of a 1st release switch 29 (step S42). If the 1st release switch 29 is OFF, the flow jumps to step S51; otherwise, the CPU 21 executes a "visual axis detection" subroutine (to be described later), i.e., performs visual axis detection synchronized with the ON operation of the 1st release switch (step S43).

Subsequently, the CPU 21 executes a "distance measurement" subroutine (to be described later) to perform multi-AF processing and selection of distance measurement information (step S44). The CPU 21 executes a "diopter correction A" subroutine (to be described later) to detect an optimal value while driving the diopter optical system 32 included in the finder optical system 26 on the basis of the distance measurement information and information associated with a diopter (step S45). Thereafter, the CPU 21 discriminates the state of the 1st release switch 29 again (step S46). If the 1st release switch 29 is OFF, the flow jumps to step S51; otherwise, the CPU 21 discriminates the state of a 2nd release switch 30 (step S47).

If the 2nd release switch 30 is OFF, the CPU 21 executes the "visual axis detection" subroutine again (step S48), and thereafter, executes a "diopter correction B" subroutine to correct any relative diopter shift on the basis of distance measurement information corresponding to the visual axis position (step S49). Thereafter, the flow returns to step S46.

On the other hand, if it is determined in step S47 that the 2nd release switch 30 is ON, the CPU 21 executes a photographing sequence such as lens driving, exposure determination, exposure, and the like (step S50), thus ending this sequence (step S51).

Figure 18:
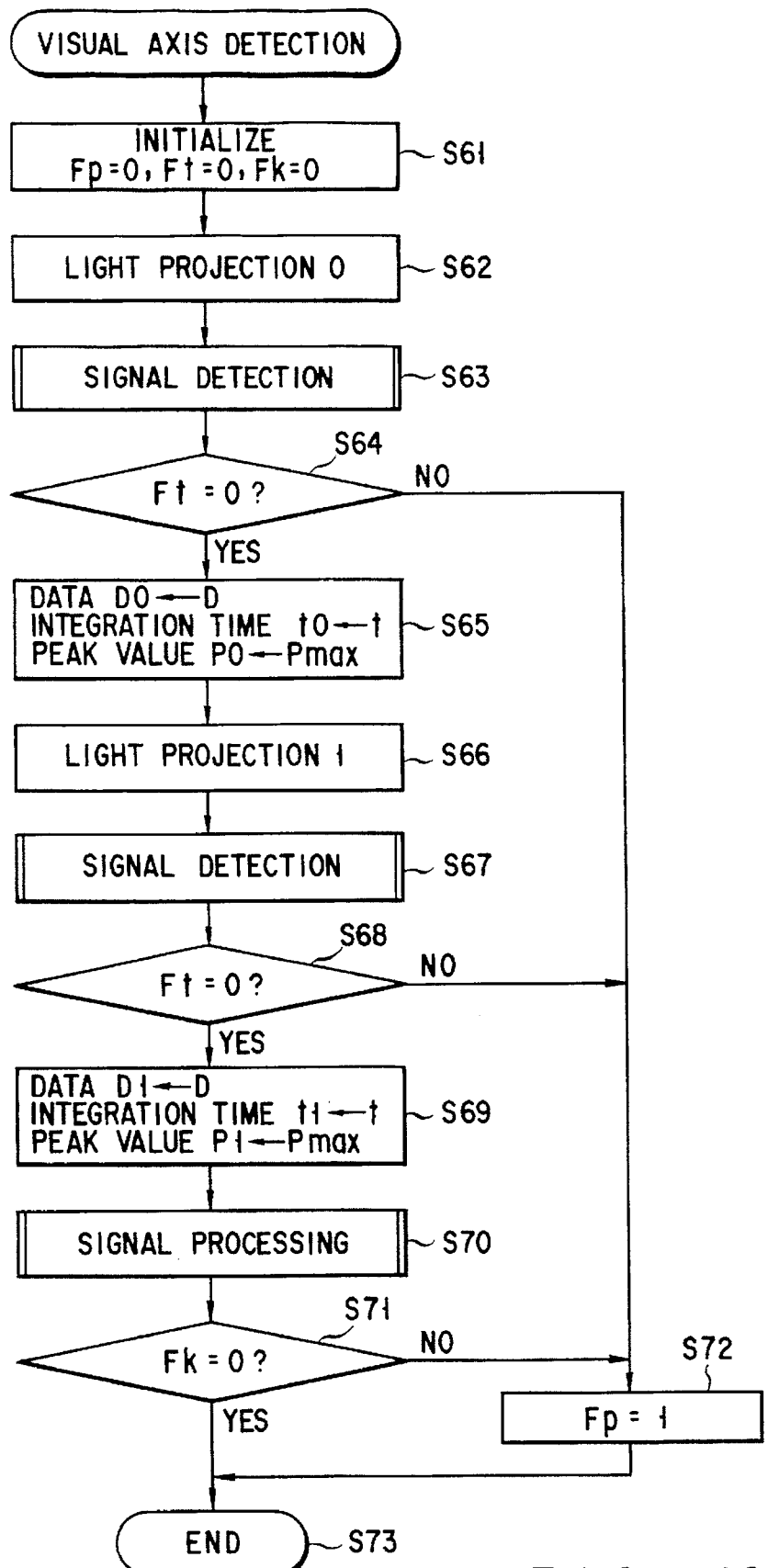
FIG. 18 is a flow chart showing the sequence of a "visual axis detection" subroutine according to the third embodiment.

The sequence of the "visual axis detection" subroutine according to the third embodiment will be described below with reference to the flow chart in FIG. 18. In this sequence, the CPU 21 performs initialization first. More specifically, the CPU 21 resets flags Fp, Ft, and Fk to be "0" (step S61). The CPU 21 performs light projection (light projection 0) for generating a red-eye image (step S62), and executes a "signal detection" subroutine (to be described later) (step S63).

The CPU 21 discriminates if the flag Ft associated with the integration time is Ft=0 (step S64). If N in step S64, the flow jumps to step S72. However, if Y in step S64, the CPU 21 stores a detected integration time ts in t0 (step S65). Then, the CPU 21 controls the LED circuit 23 to perform light projection (light projection 1) so as not to generate a red-eye image (step S66), and executes a "signal detection" subroutine (to be described later) (step S67). The CPU 21 discriminates if the flag Ft associated with the integration time is Ft=0 (step S68). If N in step S68, the flow jumps to step S72. However, if Y in step S68, the CPU 21 stores a detected integration time ts in t1 (step S69). Then, the CPU 21 executes a "signal processing" subroutine (to be described later) to execute signal processing for discriminating the reliability of the detected signal and calculating the visual axis direction (step S70).

Furthermore, the CPU 21 discriminates if the flag Fk associated with reliability is Fk=0 (step S71). If N in step S71, the flow advances to step S72, and the CPU 21 sets the flag Fp for discriminating the overall reliability to be "1". However, if Y in step S71, this sequence ends (step S73).

FIG. 19 shows the sequence of the "signal detection" subroutine. This sequence will be described below. When the "signal detection" subroutine is started, the CPU 21 performs initialization first. More specifically, the CPU 21 sets the flag Ft associated with integration to be Ft=0 so as to reset integration, and resets a timer (step S81). Subsequently, the CPU 21 starts integration (step S82), and performs limiter discrimination of the integration time (step S83).

If t>Tmax (Tmax is the limiter time of integration and has a predetermined value) in step S83, the flow jumps to step S89; otherwise, the peak monitor level of the sensor 25 is discriminated (step S84). If a peak value is not detected, the flow returns to step S83.

If a peak value is detected in step S84, the integration (the integration time ts) ends (step S85), and the integration time ts is discriminated (step S86). If ts<Tmin in step S86, the flow advances to step S89, and the flag Ft is set to be "1" (step S89), thus ending this sequence (step S90).

On the other hand, if ts≧Tmin, a signal is read out and processed (AGC, A/D, and the like) (step S87), and a peak value coordinate Pmax is detected from the readout signal (step S88), thus ending this sequence (step S90). Note that the integration control is attained by monitoring the output level in real time, but detection may be attained in a plurality of predetermined times. If it is assumed that light reflected by the eye does not change so largely, the integration control may be performed in a limited time. In other words, an accumulation type sensor without any monitor function may be used.

Figure 20:
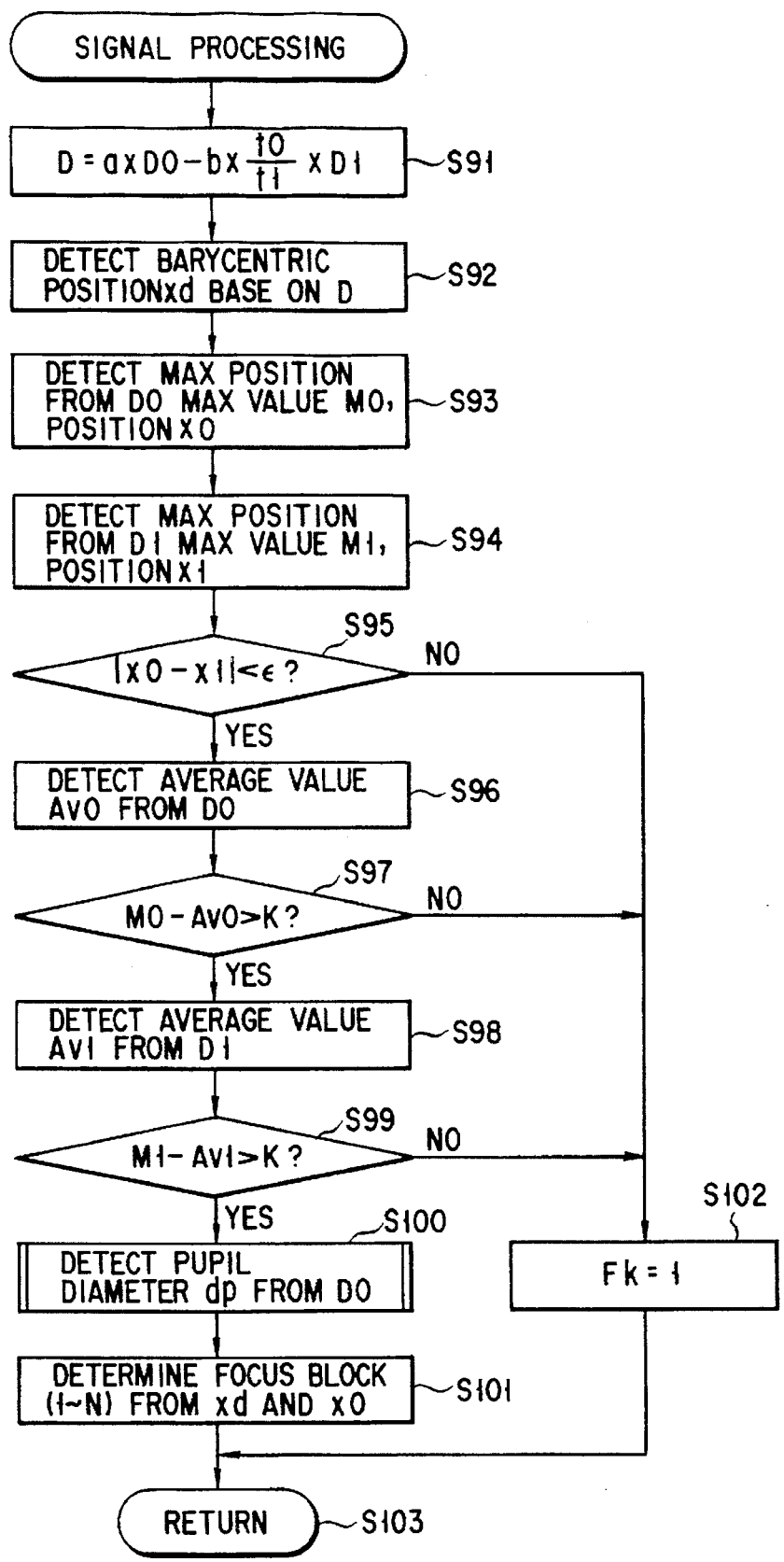
FIG. 20 is a flow chart showing the sequence of a "signal processing" subroutine according to the third embodiment.

FIG. 20 shows the sequence of the "signal processing" subroutine. This subroutine will be described below. When the signal processing is started, the CPU 21 generates data D by multiplying detected data D0 and D1 with predetermined weighting coefficients (D=a×D0−b×(t0/t1)×D1; a and b: predetermined variables) (step S91).

Subsequently, the CPU 21 detects a barycentric position xd using the data D (step S92), detects a MAX value position (the barycentric position of a MAX data group when there are a plurality of MAX values) x0 and a MAX value M0 using the data D0 (step S93), and detects a MAX value position (the barycentric position of a MAX data group when there are a plurality of MAX values) x1 and a MAX value M1 using the data D1 (step S94). The CPU 21 evaluates the shift amount between x0 and x1 (i.e., evaluates the moving amount of the eye) (step S95).

If |x0−x1|≧ε in step S95, the flow jumps to step S102. If |x0−x1|<ε in step S95, the CPU 21 calculates an average value Av0 from the data D0 (step S96). Subsequently, the CPU 21 evaluates the difference between the MAX value M0 of the data D0 and the average value Av0 (k is a predetermined value) (step S97). If M0−Av0≦k in step S97, the flow jumps to step S102; if M0−Av0>k in step S97, the CPU 21 calculates an average value Av1 from the data D1 (step S98).

The CPU 21 then evaluates the difference between the MAX value M1 of the data D1 and the average value Av1 (k is a predetermined value) (step S99). If M1−Av1≦k in step S99, the flow advances to step S102; if M1−Av1>k in step S99, the CPU 21 detects a pupil diameter dp from the detection signal D (step S100). The CPU 21 determines a detection block on the basis of the detected barycentric position xd of a red-eye image and the detected Purkinje image position x0 (step S101), and the flow then escapes from this sequence (step S103).

In step S102, the CPU 21 sets the flag Fk associated with the overall reliability to be Fk=1, and the control escapes from this sequence (step S103). In step S95 above, the movement of the eye is discriminated based on the detection signals D0 and D1, and in steps S97 and S99, blinking is discriminated.

When the finder optical system 26 includes a noise signal source such as inner surface reflection, noise signals Dd0 and Dd1 may be detected in advance by turning on the LED while shielding the eyepiece side of the finder, a noise signal Dd may be calculated by Dd=a×Dd0−b×Dd1 (a and b: predetermined variables) (the integration time ta remains the same; the actual integration time is normalized by ta), and the difference between the detection signal D and the noise signal Dd may be stored in the signal D.

Figure 21:
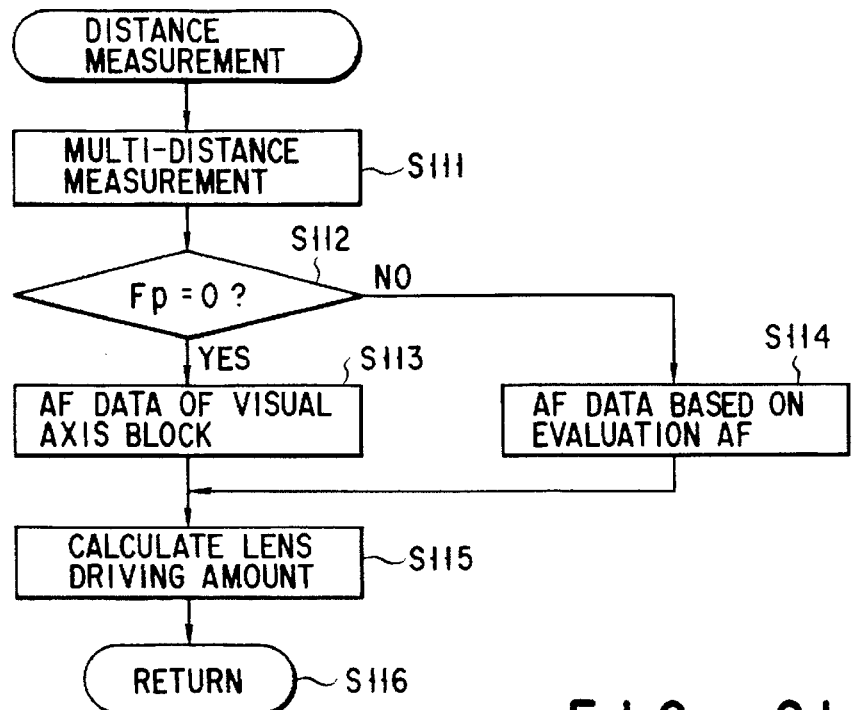
FIG. 21 is a flow chart showing the sequence of a "distance measurement" subroutine according to the third embodiment.

The sequence of the "distance measurement" subroutine executed in step S104 in FIG. 20 will be described below with reference to the flow chart in FIG. 21.

When the distance measurement is started, the multi-AF circuit 22 performs multi-distance measurement (step S111), and the flag Fp associated with the overall reliability is evaluated (step S112). If Fp≠0, AF data is set in a known evaluation AF algorithm without using any visual axis data (step S114). If Fp=0, AF data is set on the basis of the distance measurement block determined by the visual axis direction (step S113). The lens driving amount is calculated based on the AF data (step S115), and thereafter, the control ends this sequence (step S116).

Figure 22:
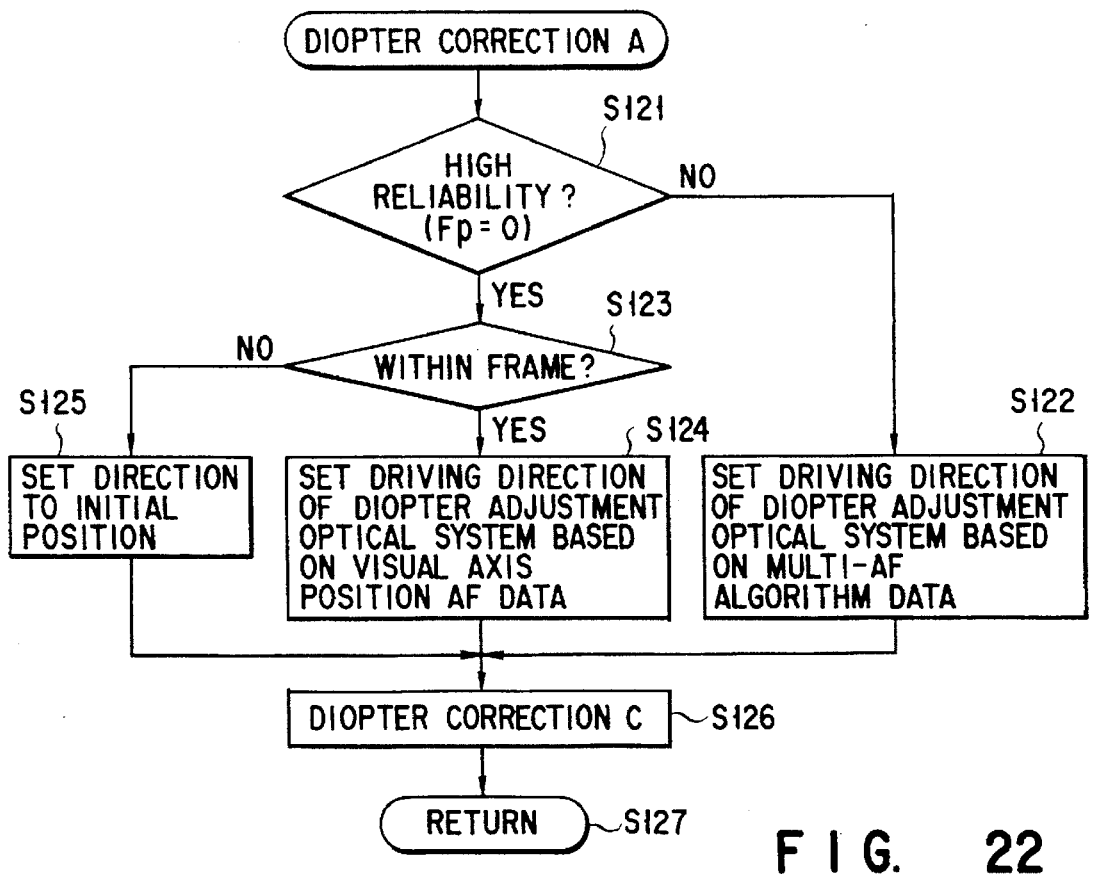
FIG. 22 is a flow chart showing the sequence of a "diopter correction A" subroutine according to the third embodiment.

The sequence of "diopter correction A" subroutine will be described below with reference to the flow chart in FIG. 22. When this subroutine is started, the CPU 21 discriminates the reliability of visual axis information (Fp=0) (step S121). If it is determined in step S121 that the reliability is low (Fp=1), the CPU 21 sets the driving direction (the shift direction from the initial position) of the diopter adjustment optical system of the eyepiece system in correspondence with the distance information determined based on multi-AF data (step S122), and the flow advances to step S126.

On the other hand, if it is determined in step S121 that the reliability is high (Fp=0), the CPU 21 checks if the visual axis range falls within the frame (a position outside the frame corresponds to a portion for displaying the camera state on the surrounding portion of the finder frame) (step S123). If Y in step S123, the CPU 21 sets the driving direction (the shift direction from the initial position) of the diopter adjustment optical system 32 of the objective system in correspondence with distance measurement information corresponding to the visual axis position (step S124), and the flow then advances to step S126.

Furthermore, if N in step. S123, the CPU 21 sets the moving direction to the initial position (an equivalent distance of a finder display) (step S125). Then, the CPU 21 executes the "diopter correction C" subroutine (to be described below) to perform a diopter correction driving operation (step S126). Then, the control ends this sequence (step S127).

Figure 23:
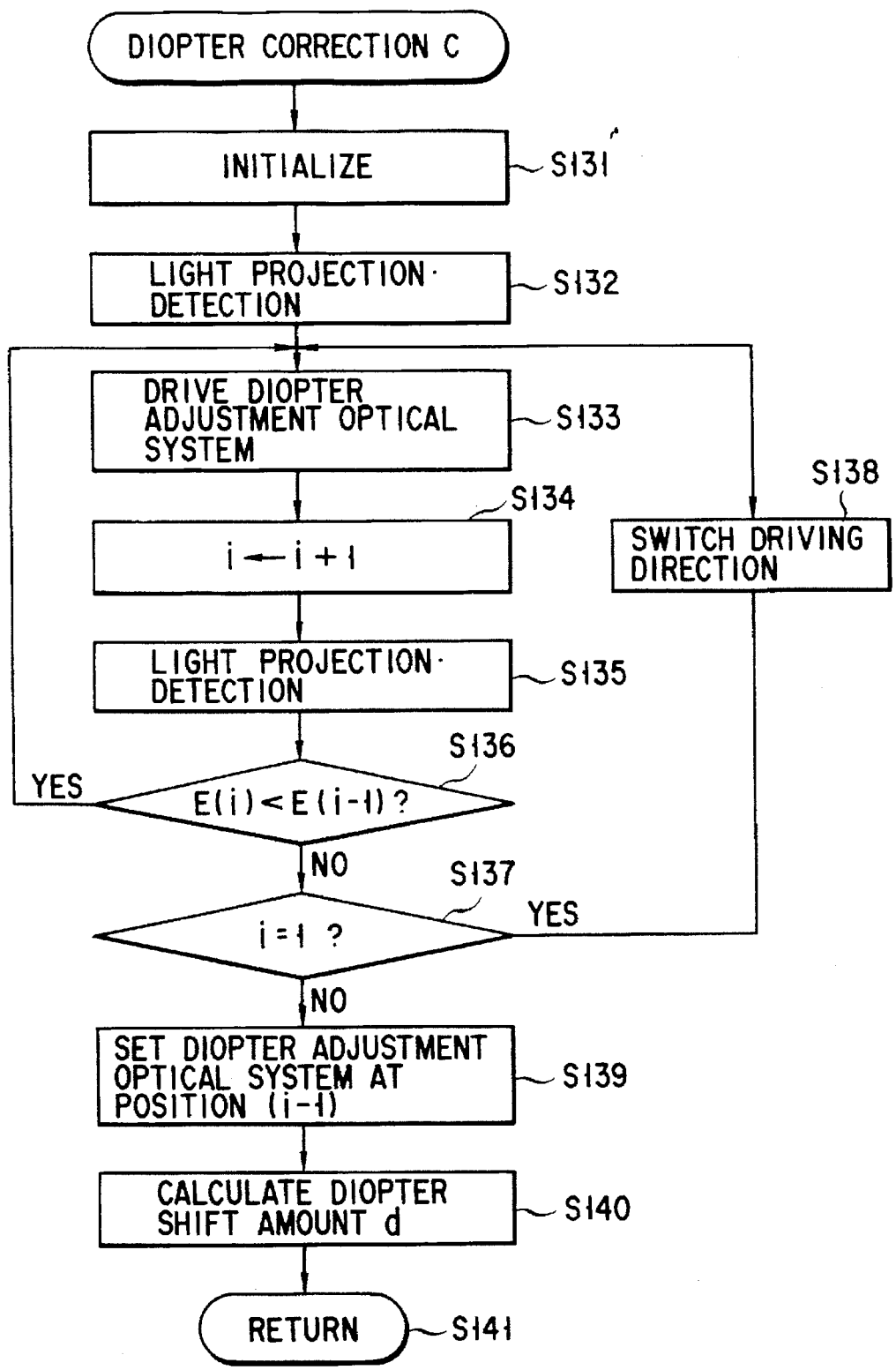
FIG. 23 is a flow chart showing the sequence of a "diopter correction C" subroutine according to the third embodiment.

The sequence of the "diopter correction C" subroutine will be described below with reference to the flow chart in FIG. 23. When the sequence of the "diopter correction C" subroutine is started, the CPU 21 performs initialization (a variable i=0) (step S131), and executes a light projection-detection subroutine (step S132).

The CPU 21 drives the diopter adjustment optical system 32 by a predetermined step (driving amount) (step S133), and increments the variable i (step S134). The CPU 21 executes the light projection-detection subroutine again (step S135), and evaluates the detected value (step S136). If E(i)<E(i−1), the flow returns to step S133.

On the other hand, if E(i)≧E(i−1) (step S136), the CPU 21 discriminates the variable (i=1) (step S137). If i=1, the driving direction is switched, and the flow returns to step S133 (step S138). Furthermore, if i≠1, the CPU 21 sets the diopter adjustment optical system 32 at a position (i−1) again (step S139), and calculates a shift amount d (a shift between the initially set state and the personal diopter) from the initial position in consideration of distance measurement information (step S140). Thereafter, the control ends this sequence (step S141).

Figure 24:
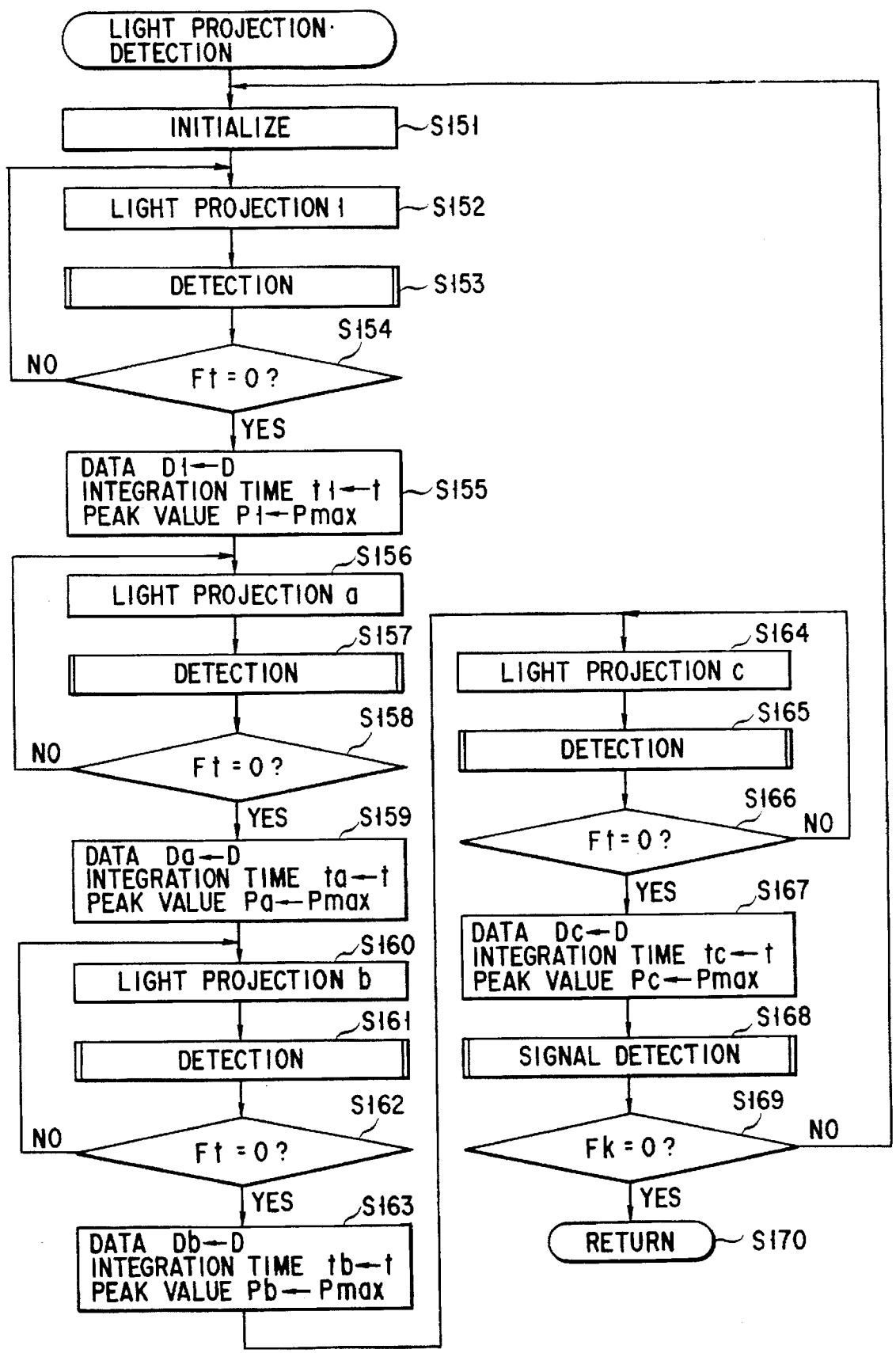
FIG. 24 is a flow chart showing the sequence of a "light projection·detection" subroutine according to the third embodiment.

FIG. 24 shows the sequence of the "light projection-detection" subroutine. This sequence will be described below. When the sequence of the "light projection-detection" subroutine is started, the CPU 21 performs initialization first. In this case, the CPU 21 sets the flags Ft=0, Fk=0, Fa=0, Fb=0, and Fc=0 (step S151).

Thereafter, the CPU 21 performs light projection (LED1) not to generate a red-eye image (step S152), performs signal detection (step S153), and discriminates if the flag Ft associated with the integration time is set to be Ft=0 (step S154). If Ft≠0, the flow returns to step S152; if Ft=0, the CPU 21 stores the detected integration time ts in t1, data D in D1, and a peak value Pmax in P1 (step S155).

The CPU 21 performs light projection using the LEDa for generating a red-eye image depending on the diopter state (step S156), performs signal detection (step S157), and discriminates if the flag Ft associated with the integration time is set to be Ft=0 (step S158). If Ft≠0, the flow returns to step S156; if Ft=0, the CPU 21 stores the detected integration time ts in ta, data D in Da, and a peak value Pmax in Pa (step S159).

Subsequently, the CPU 21 performs light projection using the LEDb for generating a red-eye image depending on the diopter state (step S160), performs signal detection (step S161), and discriminates if the flag Ft associated with the integration time is set to be Ft=0 (step S162). If Ft≠0, the flow returns to step S160; if Ft=0, the CPU 21 stores the detected integration time ts in tb, data D in Db, and a peak value Pmax in Pb (step S163).

Then, the CPU 21 performs light projection using the LEDc for generating a red-eye image depending on the diopter state (step S164), performs signal detection (step S165), and discriminates if the flag Ft associated with the integration time is set to be Ft=0 (step S166). If Ft≠0, the flow returns to step S164; if Ft=0, the CPU 21 stores the detected integration time ts in ta, data D in Dc, and a peak value Pmax in Pc (step S167).

The CPU 21 calculates an evaluation value E(i) using the detected signals (step S168), and discriminates the flag Fk (a flag for evaluating the reliability of detected data) (step S169). If Fk=1, the flow returns to step S151 to perform light projection-detection again; if Fk=0, the control ends this sequence (step S170).

Figure 25:
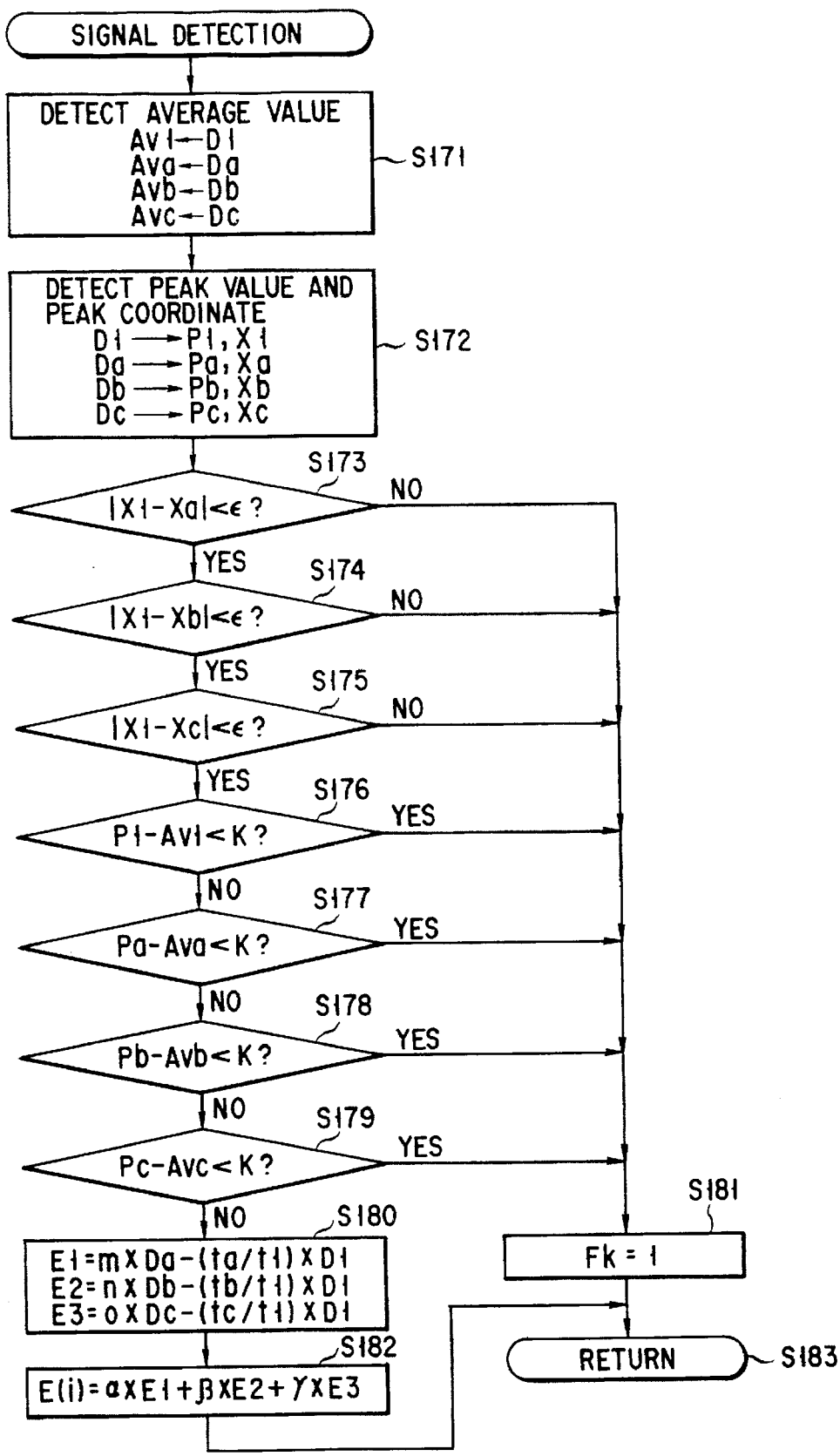
FIG. 25 is a flow chart showing the sequence of a "signal detection" subroutine according to the third embodiment.

The sequence of the "signal detection" subroutine will be described below with reference to the flow chart in FIG. 25.

When the sequence of the "signal detection" subroutine is started, the CPU 21 detects average values Av1, Ava, Avb, and Avc from detected data D1, Da, Db, and Dc (step S171), and detects peak values P1, Pa, Pb, and Pc, and coordinates x1, xa, xb, and xc from the detected data D1, Da, Db, and Dc (step S172). The CPU 21 evaluates shifts between the peak coordinate of the detected data D1 and those of the data Da, Db, and Dc (steps S173 to S175). If the shift amount is equal to or larger than a predetermined value, the flow advances to step S181.

On the other hand, if the shift amount is smaller than the predetermined value, the CPU 21 evaluates the peak value and average value of each detected data (steps S176 to S179). If the difference between the peak value and the average value is smaller than a predetermined value, the flow advances to step S181; if the difference between the peak value and the average value is equal to or larger than the predetermined value, evaluation values are calculated (step S180). Values E1, E2, and E3 are obtained by subtracting data (D1), which generates no red-eye image and is normalized by the integration time, from data (Da, Db, and Dc) which generate a red-eye image depending on the diopter state and are respectively multiplied with predetermined coefficients (m, n, and o).

Then, the CPU 21 calculates the evaluation value E(i). In this case, the CPU 21 multiplies the values E1, E2, and E3 with predetermined weighting coefficients ($\alpha$, $\beta$, and $\gamma$), and adds these products (step S182). In step S181, the flag associated with the reliability of the detected data is set to be "1", and thereafter, the control ends this sequence (step S183).

Figure 27:
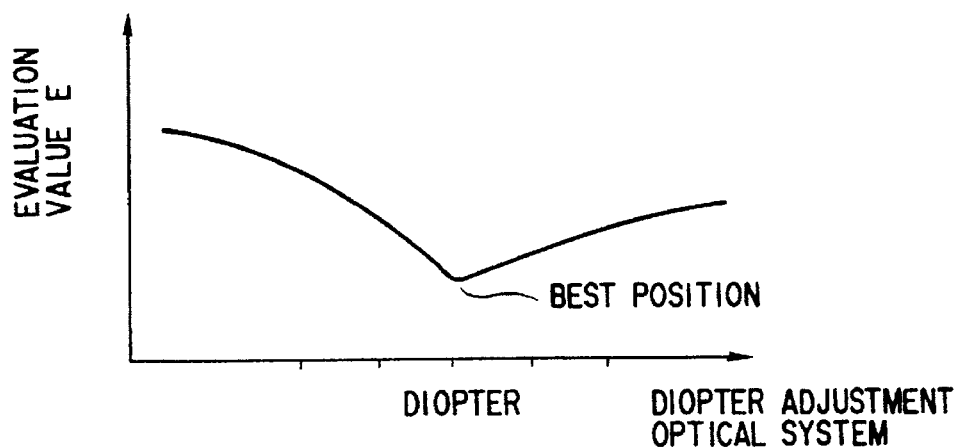
FIG. 27 is a graph showing a change in evaluation value E(i) obtained when a diopter adjustment optical system is driven.

FIG. 27 shows a change in evaluation value E(i) when the diopter adjustment optical system is driven. As can be seen from FIG. 27, the evaluation value becomes minimum at the optimal diopter position.

Figure 26:
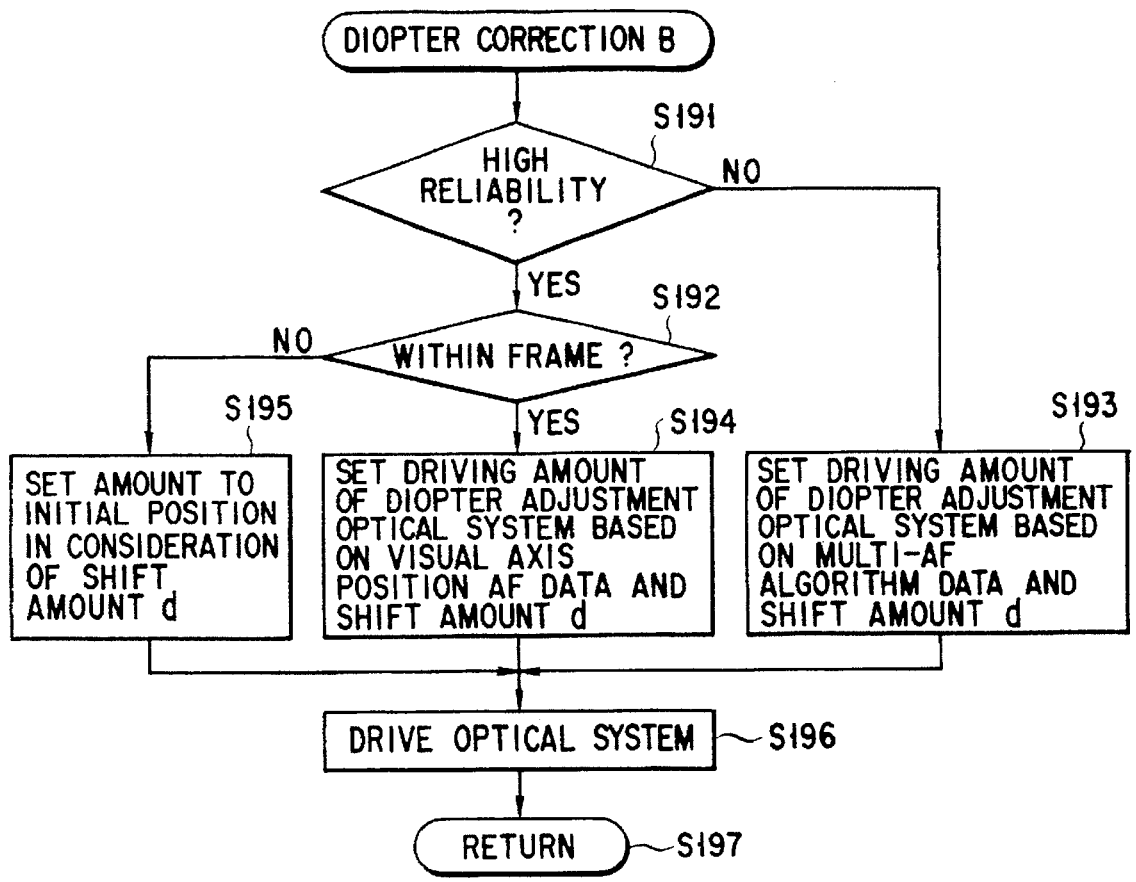
FIG. 26 is a flow chart showing the sequence of a "diopter correction B" subroutine according to the third embodiment.

The sequence of the "diopter correction B" subroutine will be described below with reference to the flow chart in FIG. 26.

When the sequence of the "diopter correction B" subroutine is started, the CPU 21 discriminates the reliability (Fp=0) of visual axis information (step S191). If it is determined in step S191 that the reliability is low (Fp=1), the CPU 21 sets the driving amount (the shift amount from the current position) of the diopter adjustment optical system of the eyepiece system in correspondence with the distance measurement information determined based on multi-AF data and the shift amount d of a personal diopter (step S193), and the flow then, advances to step S196.

On the other hand, if it is determined in step S191 that the reliability is high (Fp=0), the CPU 21 discriminates if the visual axis range falls within the frame (a position outside the frame corresponds to a portion for displaying the camera state on the surrounding portion of the finder frame) (step S192). If Y in step S192, the CPU 21 sets the driving amount (the shift amount from the current position) of the diopter adjustment optical system 32 of the objective system in correspondence with distance measurement information corresponding to the visual axis position and the shift amount d of a personal diopter (step S194), and thereafter, the flow advances to step S196. However, if N in step S192, the CPU 21 sets the moving amount to the initial position (an equivalent distance of a finder display and an appropriate range) in consideration of the shift amount d of the personal diopter (step S195). The CPU 21 drives the optical system (eyepiece system) by the driving amount set in a corresponding one of steps S193 to S195 (step S196), and thereafter, the control ends this sequence (step S197).

As described above, according to the present invention, since a visual axis detection system with a simple arrangement is commonly used, a finder, in which a frame portion at the visual axis position can always be optimally observed (in an in-focus state), can be provided.

The embodiments of the present invention have been described. However, the present invention is not limited to these particular embodiments, and various changes and modifications may be made. For example, the visual axis detection method may use an area sensor. The present invention is not limited to a real-image finder device, but may be applied to a virtual-image finder device. In the present invention, reliability discrimination is achieved based on the blinking and the movement of the eye, and is preferably combined with discrimination of the contact state between the camera and the face (an operator looks into the camera finder) of an operator and discrimination of spectacles.

Furthermore, visual axis detection may be performed parallel to the camera sequence such as AF, AE, and the like. In the AF method, passive type two-dimensional wide field AF using an area sensor may be used, or discrete multi-AF using a smaller number of distance measurement points may be performed.

Moreover, the visual axis detection method may be realized by methods (measurement of the cornea shape, measurement of the fundus pattern state, and the like) other than the above embodiments. The peak position of a signal is used in the flows of visual axis detection and diopter detection. However, data other than the peak position may be used. For example, a barycentric position binarized with a predetermined level may be used. A barycentric position may be detected by replacing values equal to or lower than a predetermined level with 0. Also, a peak point with the steepest gradient may be used. The diopter adjustment optical system and the visual axis detection optical system are preferably driven to optimize each other. The diopter adjustment optical system may contact the final lens surface of the eyepiece system.

According to the present invention, since diopter correction is performed based on distance measurement information corresponding to visual axis information, the observation point of a photographer can always be in focus. Furthermore, since a portion of the visual axis detection system is commonly used in detection of the diopter state (imaging state of an eye), a simple finder device, in which a frame portion at the visual axis position of a photographer can always be optimally observed (in an in-focus state), can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general invention concept as defined by the appended claims and their equivalents.

What is claimed is:

1. A camera with a finder device which is capable of diopter adjustment, comprising:

detection means, arranged in the finder device, for detecting a visual axis direction and a fundus imaging state of an observer;

multi-distance measurement means for measuring distances to a plurality of positions in a photographing frame;

diopter correction means for adjusting a primary imaging position where an object image is focused by an objective optical system; and driving means for driving said diopter correction means in accordance with an output from said detection means and an output from said multi-distance measurement means.

2. A camera with a finder device which is capable of diopter adjustment and does not include a mat in an optical path, comprising:

detection means, arranged in the finder device, for detecting a visual axis direction and a fundus imaging state of an observer;

multi-distance measurement means for measuring distances to a plurality of positions in a photographing frame;

magnification correction means for adjusting an image magnification of the finder device; and driving means for driving said magnification correction means in accordance with an output from said detection means and an output from said multi-distance measurement means.

3. A camera according to claim 1, wherein said detection means sequentially projects light beams with different incident angles onto an eyeball of the observer of the finder device, and detects the visual axis direction and the fundus imaging state on the basis of features of the light beams reflected by the eyeball.

4. A camera which includes multi-distance measurement means for measuring distances to a plurality of points in a photographing frame, and visual axis detection means for detecting a visual axis direction of a photographer, comprising:

a finder optical system including diopter correction means;

driving means for driving said diopter correction means; and control means for controlling said driving means on the basis of an output from said visual axis detection means and an output from said multi-distance measurement means.

5. A camera according to claim 1, wherein said diopter correction means comprises one of:

an optical system located between an object under observation and a primary imaging plane, and an optical system located between the primary imaging plane and an observer's eye.

6. A camera according to claim 4, wherein said diopter correction means comprises an objective optical system for correcting a primary imaging plane where an object image is focused by the objective optical system, and a magnification.

7. A camera according to claim 4, wherein said diopter correction means comprises both:

an optical system located between an object under observation and a primary imaging plane, and an optical system located between the primary imaging plane and an observer's eye.

8. A camera according to claim 4, wherein said control means sets a focus adjustment range of an observer's eye on the basis of distance measurement information corresponding to the detected visual axis direction.

9. A camera according to claim 4, wherein said visual axis detection means detects the visual axis direction on the basis of a cornea reflected light signal of an eye of the observer and a barycentric position signal of a pupil.

10. A camera having multi-distance measurement means for measuring distances to a plurality of points in a photographing frame, comprising:

a finder optical system including a diopter correction means;

visual axis detection means for detecting a visual axis direction of a observer;

blink detecting means for detecting blinking so as to discriminate reliability of a detection process of said visual axis detection means; and diopter correction means for setting a focus adjustment range of said finder optical system on the basis of an output from said multi-distance measurement means, an output from said visual axis detection means, and an output from said blink detecting means, and for performing correction.

11. A camera according to claim 10, wherein when said blink detecting means determines that the reliability is low, said diopter correction means performs diopter correction of said finder optical system on the basis of distance measurement information selected by said multi-distance measurement means.

12. A camera according to claim 10, wherein said diopter correction means comprises one of:

an optical system located between an object under observation and a primary imaging plane, and an optical system located between the primary imaging plane and an observer's eye.

13. A camera according to claim 10, wherein said diopter correction means comprises an objective optical system for correcting a primary imaging plane where an object image is focused by the objective optical system, and a magnification.

14. A camera according to claim 10, wherein said diopter correction means comprises both:

an optical system located between an object under observation and a primary imaging plane, and an optical system located between the primary imaging plane and an observer's eye.

15. A camera according to claim 10, wherein said diopter correction means sets the focus adjustment range on the basis of distance measurement information corresponding to the detected visual axis direction.

16. A camera according to claim 10, wherein said visual axis detection means detects the visual axis direction on the basis of a cornea reflected light signal of an eye of the observer and a barycentric position signal of a pupil.

17. A camera having visual axis detection means for detecting a visual axis direction of an observer, and multi-distance measurement means for measuring distances to a plurality of points in a photographing frame, comprising:

a finder optical system including a diopter correction means;

driving means for driving said diopter correction means; and a diopter correction device for setting a focus adjustment range of said finder optical system on the basis of an output from said visual axis detection means and an output from said multi-distance measurement means, and correcting an imaging position of an object image.

18. A camera according to claim 17, wherein when said diopter correction means substantially falls within a focus adjustment range of an observer's eye, said diopter correction device stops a driving operation of said diopter correction means.

19. A camera according to claim 17, wherein said diopter correction device moves said diopter correction means to fall within the focus adjustment range via said driving means, so as to minimize a change in diopter.

20. A camera according to claim 17, wherein said diopter correction means comprises one of:

an optical system located between an object under observation and a primary imaging plane, and an optical system located between the primary imaging plane and an observer's eye.

21. A camera according to claim 17, wherein said diopter correction means comprises an objective optical system for correcting a primary imaging plane where an object image is focused by the objective optical system, and a magnification.

22. A camera according to claim 17, wherein said diopter correction means comprises both:

an optical system located between an object under observation and a primary imaging plane, and an optical system located between the primary imaging plane and an observer's eye.

23. A camera according to claim 17, wherein said diopter correction device sets the focus adjustment range of an observer's eye on the basis of distance measurement information corresponding to the detected visual axis direction.

24. A camera according to claim 17, wherein said visual axis detection means detects the visual axis direction on the basis of a cornea reflected light signal of an eye of the observer and a barycentric position signal of a pupil.

25. A camera having multi-distance measurement means for measuring distances to a plurality of points in a photographing frame, and visual axis detection means for detecting a visual axis direction of an observer, comprising:

an optical finder device including a diopter correction means for determining framing;

diopter detection means, arranged in said finder device, for detecting a a diopter value which is detected by a diopter detecting device with respect to an observer; and driving means for driving said diopter correction means to cause an imaging position of an object to fall within a focus adjustment range of an observer's eye on the basis of the detected diopter value and at least one of an output from said multi-distance measurement means and an output from said visual axis detection means.

26. A camera according to claim 25, wherein said visual axis detection means and said diopter detection means have a common detection optical path and a common detection element.

27. A camera according to claim 25, further comprising a photographing lens which can perform zooming, and wherein said finder device includes a magnification optical system which is interlocked with zooming of said photographing lens, and performs the diopter correction on the basis of at least an image magnification and an object distance.

28. A camera according to claim 2, wherein said detection means sequentially projects light beams with different incident angles onto an eyeball of the observer of the finder device, and detects the visual axis direction and the fundus imaging state on the basis of features of the light beams reflected by the eyeball.

* * * * *